United States Patent
Hwang et al.

(10) Patent No.: US 9,734,153 B2
(45) Date of Patent: Aug. 15, 2017

(54) MANAGING RELATED DIGITAL CONTENT

(75) Inventors: Douglas C. Hwang, New York, NY (US); Ajay Arora, New York, NY (US); Douglas S. Goldstein, New York, NY (US); Shirley C. Yang, New York, NY (US); Guy A. Story, Jr., New York, NY (US)

(73) Assignee: Audible, Inc., Newark, NJ (US)

( * ) Notice: Subject to any disclaimer, the term of this patent is extended or adjusted under 35 U.S.C. 154(b) by 408 days.

(21) Appl. No.: 13/535,264

(22) Filed: Jun. 27, 2012

(65) Prior Publication Data

US 2013/0074133 A1    Mar. 21, 2013

Related U.S. Application Data

(63) Continuation-in-part of application No. 13/070,313, filed on Mar. 23, 2011.

(51) Int. Cl.
*G06F 17/30* (2006.01)
(52) U.S. Cl.
CPC .............................. *G06F 17/30038* (2013.01)
(58) Field of Classification Search
None
See application file for complete search history.

(56) References Cited

U.S. PATENT DOCUMENTS

| | | | |
|---|---|---|---|
| 5,203,705 A | 4/1993 | Hardy et al. | |
| 5,351,189 A | 9/1994 | Doi et al. | |
| 5,657,426 A | 8/1997 | Waters et al. | |
| 5,737,489 A | 4/1998 | Chou et al. | |
| 5,978,754 A | 11/1999 | Kumano | |
| 6,208,956 B1 | 3/2001 | Motoyama | |

(Continued)

FOREIGN PATENT DOCUMENTS

| CN | 103988193 A | 8/2014 |
|---|---|---|
| EP | 2689346 | 1/2014 |

(Continued)

OTHER PUBLICATIONS

Fabio Vignoli, Carlo Braccini, Aug. 7-10, 2009, A Text-Speech Synchronization Technique With Application to Talking Heads, Auitory-Visual Speech Processing, ISCA Archive.*

(Continued)

*Primary Examiner* — Hassan Phillips
*Assistant Examiner* — Omeed D Rahgozar
(74) *Attorney, Agent, or Firm* — Knobbe, Martens, Olson & Bear, LLP

(57) ABSTRACT

Aspects of the present disclosure relate to one or more configured computing systems identifying companion content and supplemental content for a base content. Companion content may include, for example, video adaptations of the base content. Supplemental content may include content referenced or related in subject matter to the base content. Information regarding companion content may be utilized to enable a user to interchangeably or synchronously present either a base content (e.g., an eBook or audio book) with the companion content (e.g., a movie adaptation). Information regarding supplemental content may be utilized to present the supplemental content during consumption of a base content, or to save supplemental content for later viewing.

22 Claims, 8 Drawing Sheets

(56) References Cited

U.S. PATENT DOCUMENTS

| | | | |
|---|---|---|---|
| 6,260,011 B1 | 7/2001 | Heckerman et al. | |
| 6,356,922 B1* | 3/2002 | Schilit et al. | 715/236 |
| 6,766,294 B2 | 7/2004 | MaGinite et al. | |
| 6,912,505 B2* | 6/2005 | Linden et al. | 705/14.53 |
| 7,107,533 B2 | 9/2006 | Duncan et al. | |
| 7,231,351 B1 | 6/2007 | Griggs | |
| 8,106,285 B2 | 1/2012 | Gerl et al. | |
| 8,109,765 B2 | 2/2012 | Beattie et al. | |
| 8,131,545 B1* | 3/2012 | Moreno et al. | 704/235 |
| 8,131,865 B2* | 3/2012 | Rebaud et al. | 709/229 |
| 8,442,423 B1 | 5/2013 | Ryan et al. | |
| 8,548,618 B1 | 10/2013 | Story, Jr. et al. | |
| 8,577,668 B2 | 11/2013 | Rosart et al. | |
| 8,855,797 B2 | 10/2014 | Story, Jr. et al. | |
| 8,862,255 B2 | 10/2014 | Story, Jr. et al. | |
| 8,948,892 B2 | 2/2015 | Story, Jr. et al. | |
| 9,037,956 B2 | 5/2015 | Goldstein et al. | |
| 2002/0002459 A1 | 1/2002 | Lewis et al. | |
| 2002/0007349 A1* | 1/2002 | Yuen | 705/52 |
| 2002/0041692 A1 | 4/2002 | Seto et al. | |
| 2002/0116188 A1 | 8/2002 | Amir et al. | |
| 2003/0061028 A1* | 3/2003 | Dey et al. | 704/9 |
| 2003/0083885 A1 | 5/2003 | Frimpong-Ansah | |
| 2003/0115289 A1 | 6/2003 | Chinn et al. | |
| 2004/0261093 A1 | 12/2004 | Rebaud et al. | |
| 2005/0022113 A1 | 1/2005 | Hanlon | |
| 2006/0148569 A1 | 7/2006 | Beck | |
| 2007/0016314 A1 | 1/2007 | Chan et al. | |
| 2007/0061487 A1 | 3/2007 | Moore et al. | |
| 2007/0136459 A1 | 6/2007 | Roche et al. | |
| 2007/0276657 A1 | 11/2007 | Gournay et al. | |
| 2007/0282844 A1 | 12/2007 | Kim et al. | |
| 2008/0005656 A1 | 1/2008 | Pang et al. | |
| 2008/0027726 A1 | 1/2008 | Hansen et al. | |
| 2008/0177822 A1 | 7/2008 | Yoneda | |
| 2008/0294453 A1 | 11/2008 | Baird-Smith et al. | |
| 2009/0047003 A1 | 2/2009 | Yamamoto | |
| 2009/0136213 A1 | 5/2009 | Calisa et al. | |
| 2009/0210213 A1 | 8/2009 | Cannon et al. | |
| 2009/0222520 A1 | 9/2009 | Sloo et al. | |
| 2009/0228570 A1 | 9/2009 | Janik et al. | |
| 2009/0233705 A1 | 9/2009 | Lemay et al. | |
| 2009/0276215 A1 | 11/2009 | Hager | |
| 2009/0281645 A1 | 11/2009 | Kitahara et al. | |
| 2009/0305203 A1 | 12/2009 | Okumura et al. | |
| 2009/0319273 A1 | 12/2009 | Mitsui et al. | |
| 2010/0042682 A1 | 2/2010 | Kaye | |
| 2010/0042702 A1 | 2/2010 | Hanses | |
| 2010/0064218 A1 | 3/2010 | Bull et al. | |
| 2010/0070575 A1 | 3/2010 | Bergquist et al. | |
| 2010/0225809 A1 | 9/2010 | Connors et al. | |
| 2010/0279822 A1 | 11/2010 | Ford | |
| 2010/0286979 A1* | 11/2010 | Zangvil et al. | 704/9 |
| 2010/0287256 A1 | 11/2010 | Neilio | |
| 2011/0067082 A1 | 3/2011 | Walker | |
| 2011/0087802 A1 | 4/2011 | Witriol et al. | |
| 2011/0119572 A1 | 5/2011 | Jang et al. | |
| 2011/0153330 A1 | 6/2011 | Yazdani et al. | |
| 2011/0177481 A1 | 7/2011 | Haff et al. | |
| 2011/0184738 A1 | 7/2011 | Kalisky et al. | |
| 2011/0191105 A1 | 8/2011 | Spears | |
| 2011/0231474 A1* | 9/2011 | Locker et al. | 709/203 |
| 2011/0246175 A1 | 10/2011 | Yi et al. | |
| 2011/0288861 A1 | 11/2011 | Kurzweil et al. | |
| 2011/0288862 A1 | 11/2011 | Todic | |
| 2011/0296287 A1 | 12/2011 | Shahraray et al. | |
| 2012/0030288 A1 | 2/2012 | Burckart et al. | |
| 2012/0109640 A1 | 5/2012 | Anisimovich et al. | |
| 2012/0150935 A1 | 6/2012 | Frick et al. | |
| 2012/0166180 A1* | 6/2012 | Au | 704/9 |
| 2012/0197998 A1 | 8/2012 | Kessel et al. | |
| 2012/0245719 A1 | 9/2012 | Story, Jr. et al. | |
| 2012/0245720 A1 | 9/2012 | Story, Jr. et al. | |
| 2012/0245721 A1 | 9/2012 | Story, Jr. et al. | |
| 2012/0246343 A1 | 9/2012 | Story, Jr. et al. | |
| 2012/0310642 A1 | 12/2012 | Cao et al. | |
| 2012/0315009 A1 | 12/2012 | Evans et al. | |
| 2012/0324324 A1 | 12/2012 | Hwang et al. | |
| 2013/0041747 A1 | 2/2013 | Anderson et al. | |
| 2013/0073449 A1 | 3/2013 | Voynow et al. | |
| 2013/0073675 A1 | 3/2013 | Hwang et al. | |
| 2013/0130216 A1 | 5/2013 | Morton et al. | |
| 2013/0212454 A1 | 8/2013 | Casey | |
| 2013/0257871 A1 | 10/2013 | Goldstein et al. | |
| 2013/0262127 A1 | 10/2013 | Goldstein et al. | |
| 2014/0005814 A1 | 1/2014 | Hwang et al. | |
| 2014/0039887 A1 | 1/2014 | Dzik et al. | |
| 2014/0040713 A1 | 2/2014 | Dzik et al. | |
| 2014/0223272 A1 | 8/2014 | Arora et al. | |
| 2014/0250219 A1 | 9/2014 | Hwang | |
| 2015/0026577 A1 | 1/2015 | Story et al. | |

FOREIGN PATENT DOCUMENTS

| | | |
|---|---|---|
| JP | 9-265299 | 10/1997 |
| JP | 2002-140085 | 5/2002 |
| JP | 2002-328949 | 11/2002 |
| JP | 2003-304511 | 10/2003 |
| JP | 2004-029324 | 1/2004 |
| JP | 2004-117618 | 4/2004 |
| JP | 2004-266576 | 9/2004 |
| JP | 2005-189454 | 7/2005 |
| JP | 2007-522591 | 8/2007 |
| JP | 2007-249703 | 9/2007 |
| JP | 2010-250023 | 11/2010 |
| NZ | 532174 | 1/2007 |
| WO | WO 2006/029458 A1 | 3/2006 |
| WO | WO 2011/144617 | 11/2011 |
| WO | WO 2012/129438 | 9/2012 |
| WO | WO 2012/129445 | 9/2012 |
| WO | WO 2013/148724 | 10/2013 |
| WO | WO 2013/169670 | 11/2013 |
| WO | WO 2013/181158 | 12/2013 |
| WO | WO 2013/192050 | 12/2013 |
| WO | WO 2014/004658 | 1/2014 |

OTHER PUBLICATIONS

Yardena Arar, Jan. 7, 2010, Blio E-Book Platform: no. Reader (Yet), But Great Graphics.*

Beattie, V., et al., Reading Assistant: Technology for Guided Oral Reading, Scientific Learning, Apr. 10, 2012, 5 pages.

Levinson, S.E., et al., Continuous Speech Recognition from a Phonetic Transcription, Acoustics, Speech, and Signal Processing, Apr. 1990, pp. 190-199.

U.S. Appl. No. 13/070,313, filed Mar. 23, 2011, Synchronizing Digital Content.

U.S. Appl. No. 13/552,548, filed Jul. 18, 2012, Synchronizing Digital Content.

U.S. Appl. No. 13/535,240, filed Jun. 27, 2012, Managing Related Digital Content.

U.S. Appl. No. 13/602,012, filed Aug. 31, 2012, Synchronized Digital Content Samples.

U.S. Appl. No. 13/570,179, filed Aug. 8, 2012, Synchronizing Recorded Audio Content and Companion Content.

U.S. Appl. No. 13/070,422, filed Mar. 23, 2011, Managing Playback of Synchronized Content.

U.S. Appl. No. 13/070,421, filed Mar. 23, 2011, Managing Playback of Synchronized Content.

U.S. Appl. No. 13/070,439, filed Mar. 23, 2011, Managing Playback of Synchronized Content.

U.S. Appl. No. 13/483,883, filed May 30, 2012, Synchronizing Translated Digital Content.

U.S. Appl. No. 13/604,482, filed Sep. 5, 2012, Identifying Corresponding Regions of Content.

U.S. Appl. No. 13/604,486, filed Sep. 5, 2012, Selecting Content Portions for Alignment.

U.S. Appl. No. 13/758,749, filed Feb. 4, 2013, Selective Synchronous Presentation.

(56) References Cited

OTHER PUBLICATIONS

International Search Report issued in connection with International Patent Application No. PCTUS12/30186 mailed on Jun. 20, 2012, 12 pages.
International Search Report and Written Opinion in PCT/US2013/042903 mailed Feb. 7, 2014.
International Search Report issued in connection with International Application No. PCT/US13/53020 mailed on Dec. 16, 2013.
Dzik, et al., U.S. Appl. No. 13/604,482, filed Sep. 5, 2012, entitled "Identifying Corresponding Regions of Content."
Dzik, et al., U.S. Appl. No. 13/604,486, filed Sep. 5, 2012, entitled "Selecting Content Portions for Alignment."
Dzik, Steven Charles, U.S. Appl. No. 13/662,306, filed Oct. 26, 2012, entitled "Content Presentation Analysis."
Enhanced Editions, "Feature: Synched Audio and Text" Aug. 31, 2009, last accessed Nov. 15, 2012, available at http://www.enhanced-editions.com/blog/2009/08/enhanced-editions-features-exclusive-soundtracks-and-extracts/.
Hwang et al., U.S. Appl. No. 13/536,711, filed Jun. 28, 2012, entitled "Pacing Content."
International Search Report issued for PCT/US12/30198 mailed on Jun. 20, 2012, 16 pages.
Roub, Paul, "I'll Buy an E-book Reader When . . . ", Nov. 16, 2007, available at: http://roub.net/blahg/2007/11/16/ill-buy-an-eboo/ (accessed Sep. 6, 2012), 2 pages.
Weber, Frederick V., U.S. Appl. No. 13/531,376, filed Jun. 22, 2012, entitled "Modelling Expected Errors for Discriminative Training."
Office Action in Japanese Application No. 2014-501257 dated Apr. 6, 2015.
Office Action in Japanese Application No. 2014-501257 dated Aug. 25, 2014.
International Search Report and Written Opinion in PCT/US2014/014508 mailed Jun. 25, 2014.
International Preliminary Report on Patentability issued in connection with International Patent Application No. PCT/US12/30198 mailed on Jan. 30, 2014, 8 pages.
Office Action in Japanese Application No. 2014-501254 dated Oct. 14, 2014.
International Preliminary Report on Patentability in PCT/US2013/042903 mailed Dec. 2, 2014.
Extended Search Report in European Application No. 12761104.4 dated Apr. 20, 2015.
Office Action in Canadian Application No. 2830906 dated Mar. 17, 2015.
Extended Search Report in European Application No. (12761404.8) dated Jan. 26, 2015.
International Preliminary Report issued in connection with International Application No. PCT/US13/53020 mailed on Feb. 12, 2015.

* cited by examiner

The Adventures of Huckleberry Finn

600

That disturbed Jim — and me too. _____ what to do? I said, paddle ashore the f— Related Content: Civil Liberties in ap was behind, coming al Pre-Civil War America hand at the business, an Click to View More ro. Jim thought it was a good ___, ___ and waited. 604

There warn't nothing to do now but to look out sharp for the town, and not pass it without seeing it. He said he'd be mighty sure to see it, because he'd be a free man the minute he seen it, but if he missed it he'd be in a slave country again and no more show for freedom. Every little while he jumps up and says:

"Dah she is?" 608

But it warn't. It was Jack-o'-lanterns, or lightning bugs; so he set down again, and went to watching, same as before. Jim said it made him all over trembly and feverish to be so close to freedom. Well, I can tell you it made me all over trembly and feverish, too, to hear him, because I begun to get it through my head that he WAS most free — and who was to blame for it? Why, ME.

Show and Sort ▶

606

602

Menu ▶

*Fig.6.*

MANAGING RELATED DIGITAL CONTENT

CROSS-REFERENCE TO RELATED APPLICATIONS

This application is a continuation-in-part of U.S. patent application Ser. No. 13/070,313, filed Mar. 23, 2011, the priority of the filing date of which is hereby claimed under 35 U.S.C. §120, and the entire disclosure of which is incorporated herein by reference.

BACKGROUND

Generally described, computing devices and communication networks facilitate the collection and exchange of information. In a common application, computing devices, such as personal computing devices, can utilize a wide area communication network, generally referred to as the Internet, to access content or other data from other computing devices associated with content providing entities. The specific design/function of each computing device can vary the type of content exchanged between the computing devices.

Users can request data from a content providing entity so that the content is delivered to one or more computing devices in a relatively "real time" basis. For example, users can request content from a network resource (e.g., a Web site, Web service, or cloud node) for immediate presentation on a computing device display screen or they can request the immediate transfer of content, such as a document or data file, from a network resource such as a Web service for storage on the computing device. In another example, users can transmit a request, or initiate a transaction, that results in the downloading or streaming of content to a computing device. Typically, the content providing entity would initiate the transfer upon receipt of the request from the computing device.

Various computing devices associated with a user or a user account may have access to different representations of content in different content mediums. For example, a user may obtain a digital representation of content in a first content medium (e.g., an electronic book or "eBook") that can be presented on a computing device (e.g., an eBook reader). This content may be referred to as a "base" content. The same user may also obtain or have access to the content in a different content medium (e.g., a movie or video corresponding to the eBook), which may be played on the same computing device or an alternative computing device. This content may be referred to as "companion" content. The companion content may be obtained at a different time and/or from a different source than the base content. As a result, the base content and the companion content can be decoupled from one another, and additional features related to the synergy of the base content and the companion content (collectively, the "companion content pair") are not readily available to computing devices utilized by the user or associated with the user's account maintained by a content provider.

Further, a base content may be associated with additional or supplemental content. For example, an obtain eBook may mention or relate to subjects or topics that are discussed in more detail in supplemental content. Illustratively, a video file may contain an author's in depth discussion of a particular subject discussed briefly in the eBook. However, such supplemental content may be made available at a different time than the base content, or made available from a different source. As such, the base content and the supplemental content may also be decoupled from one another, and additional features related to the synergy of the base content and the supplemental content (collectively, the "supplemental content pair") may not be readily available to computing devices utilized by the user or associated with the user's account maintained by a content provider.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 6 depicts an illustrative control interface that may be used to manage playback of supplemental content.

DETAILED DESCRIPTION

Figure 1:
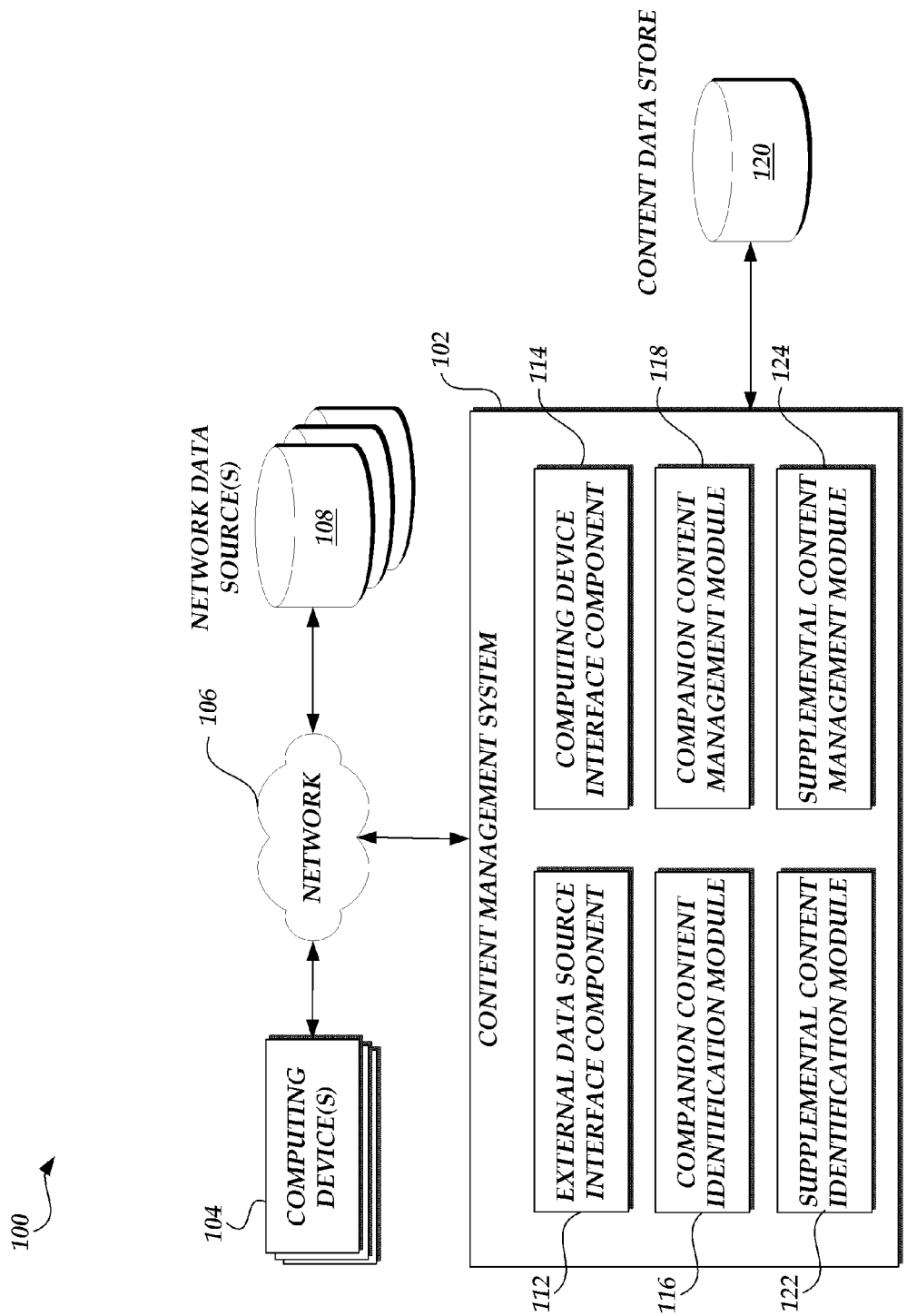
FIG. 1 is a block diagram depicting an illustrative content management environment for use in identifying companion content as well as supplemental content, and for providing synchronization information regarding the companion content and supplemental content to one or more computing devices.

Generally described, aspects of the present disclosure relate to the management of companion content, supplemental content and/or information related to companion or supplemental content. Specifically, aspects of the present disclosure relate to enabling interchangeable presentation of companion content with a base content. For example, a user may utilize a computing device, such as an eBook reader, to access a base content (e.g., an eBook). The user may further obtain or have access to corresponding companion content in a different content medium (e.g., a movie adaptation, audio book or video file corresponding to the eBook) that can be interchangeably rendered based on synchronization information. For example, a computing device associated with the user may be configured to switch between output of the base content and the companion content based on user selection, such that the companion content begins playback at a point corresponding to the last consumed portion of the eBook, or vice versa. Illustratively, a user may read an eBook, and at any point during consumption of the eBook, begin playback of a corresponding movie adaptation at a corresponding point. Thereafter, the user may switch between consumption of the eBook and consumption of the corresponding companion content, such that playback of the two content is interchangeable.

Further, aspects of the present disclosure related to enabling presentation of supplemental content during consumption of base content, or at a later time. For example, a base content may make reference to or discuss subjects or topics also discussed or referenced in supplemental content. Illustratively, an eBook may introduce a topic studied in more detail in a documentary. Accordingly, the user may be enabled to view such supplemental content during consumption of the base content, or save supplemental content for later viewing. In some embodiments, companion content and supplemental content may be made available for consumption on the same user computing device that presents a base content (e.g., via a tablet computing device capable of outputting both text and video). In other embodiments, companion content and supplemental content may be made available for consumption on a different user computing device than the device which outputs the base content. For example, as a user consumes an eBook on an eBook reader, companion content and supplemental content regarding the eBook may be delivered to a user's digital video recorder ("DVR") device, television, laptop, etc.

As a first example, a user may first obtain a base content, such as a copy of the eBook *The Adventures of Huckleberry Finn*. At the same or a different time, the user may obtain or gain access to a corresponding movie adaptation of the eBook, which may be generally referred to as an example of companion content. Both of these items of content may be made available on one or more computing devices of the user. In some embodiments, after identifying the base content and the companion content (collectively, a base content and a companion content may generally be referred to herein as a "companion content pair") as obtained by or available to the user, a related content management system can cause content synchronization information corresponding to the companion content to be transmitted to a device of the user. The synchronization information may generally facilitate interchangeable playback of a base content and a companion content, and may contain, for example, mappings of locations in the base content with locations in the companion content. In some embodiments, such as when the user has not yet obtained the companion content, the companion content itself may also be transmitted to the device of the user. With the companion content and the content synchronization information available on the same device, the device can interchangeably render the companion content (e.g., from a point at which the user stopped consuming the base content) to provide the user with an enhanced experience. An embodiment of a system for obtaining synchronization information for companion content may be found in U.S. patent application Ser. No. 13/070,313, filed Mar. 23, 2011, entitled "SYNCHRONIZING DIGITAL CONTENT" (hereinafter, the '313 application), which was incorporated by reference in its entirety above. For instance, the user may read the text *The Adventures of Huckleberry Finn*, and, upon stopping or pausing consumption of the eBook at a given point (e.g., a given page), be enabled to watch the corresponding movie adaptation from a point corresponding to the point at which consumption of the eBook stopped.

As a second example, a user may also be interested in supplemental content associated with a base content (e.g., an eBook of *The Adventures of Huckleberry Finn*). As such, a related content management system may monitor consumption of the base content in order to identify, suggest, or deliver to the user supplemental content associated with the base. For instance, during reading of the text *The Adventures of Huckleberry Finn*, the related content management system may determine subjects or topics discussed within the text, and deliver supplemental content regarding those subjects or topics to the user. Illustratively, *The Adventures of Huckleberry Finn* may discuss or implicate topics such as the American South, Mark Twain, youth life during the 19th Century, civil liberties in Pre-Civil War America, etc. As such, a user may be enabled to view a documentary, commentary, or other content, in order to learn more regarding a subject.

In some embodiments, a single computing device may be enabled to present base content, companion content, and supplemental content. For example, a desktop, laptop, or tablet computing device may be enabled to present both an eBook content and related video content. In other embodiments, multiple computing devices may be utilized by a user, each able to present one or more of the base content, companion content, and supplemental content. For example, a user may utilize an eBook reader (e.g., a dedicated reader) to consume base content, while utilizing a television or DVR to consume companion or supplemental content. Further, though base content is discussed in relation to textual content above, in some embodiments, base content may correspond to other content formats or types. For example, base content may include audio content (e.g., audio books).

A current consumption position of a base content may be monitored for purposes of presenting companion and supplemental content. Generally speaking, a position of consumption of content may refer to any information that reflects a current playback position of a consumed content, or to any measurement of an amount of content consumed by a user. For example, a position of consumption of an eBook may be indicated by a given page, chapter, paragraph, line, word, etc., or any combination thereof. As a further example, a position of consumption of an audio book may be indicated by a timestamp, a counter, a chapter, a last spoken word, etc., or any combination thereof. In some embodiments, a position of consumption may be reflected as a percentage (e.g., a point representing 25% of the content has been consumed). In other embodiments, a position of consumption may be reflected as an absolute value (e.g., at 2 hours, 30 minutes and 5 seconds into an audio book). One skilled in the art will appreciate that a position of consumption may be reflected by any combination of the above information, or any additional information reflective of a playback position of a consumed content.

Monitoring of a current consumption position in a base content may occur by a variety of mechanisms. For example, in one embodiment, the current consumption position in base content by a user may be monitored by physical input of the user (e.g., touch input indicating a current position). In another embodiment, the current reading position may be determined by other inputs, such as the frequency of page turns within content. In still more embodiments, non-physical inputs may be utilized to track the reading of a user. For example, the eye movement of a user may be tracked to determine a currently read word, or voice recognition may be utilized in order to determine a spoken word, sentence, paragraph, etc.

In some embodiments, the base content and corresponding companion content or supplemental content in a content pair may be decoupled from each other. A content pair may be decoupled, for example, by being stored on separate computing devices, by being stored in separate data stores that are not part of the same logical memory, by being obtained via different transactions, by being obtained at different times, by being obtained from different sources, or any combination thereof. For instance, a user can buy an eBook and then at a later point in time purchase a movie adaptation of the eBook from a different vendor. In such cases, the user may wish to interchangeably playback the eBook and the movie (e.g., switch between reading of the eBook and viewing of the movie, or vice versa). As a further example, a user may purchase an audio book, and at a later point in time gain access to a documentary referenced within the audio book. In such cases, a reader may wish to refer to the documentary directly while consuming the audio book. However, when such companion content or supplemental content is decoupled, it can be difficult to provide the user with a synchronous presentation experience, such as presenting portions of the companion movie corresponding to the most recently consumed text of the eBook, or notifying a user of the existence of a referenced documentary while reading an eBook.

The decoupled nature of companion content can result in a number of difficulties for providing a user with a synchronous presentation experience. Such difficulties may include, for example, determining sources from which to obtain content information identifying the companion content or supplemental content, identifying that a companion content or supplemental content matches a base content, generating content synchronization information needed to synchronize presentation of the base content and companion content or supplemental content, providing content synchronization information to a computing device with access to the base content, companion content, and/or supplemental content, managing the storage of information related to the base content, companion content, and/or supplemental content, or any combination thereof.

Since base content and corresponding companion content or supplemental content may be decoupled from each other, one or more computing devices may identify a content match, which indicates that a companion content or a supplemental content may be a companion of the base content. Further, the one or more computing devices can also identify that a user is associated with and/or has access to the base content and the companion content or supplemental content. Based on determining the content match, the one or more computing devices can identify a receiving computing device associated with the user, and cause transmission of content synchronization information related to the companion content and/or the supplemental content to the receiving computing device. Thereafter, the receiving computing device can utilize the content synchronization information to synchronously or simultaneously present companion content to the user. Further, the receiving computing device can utilize the content synchronization information to present the supplemental content in conjunction with consumption of the base content. Those skilled in the art will appreciate that more than one content may match another content. Accordingly, more than two individual contents may be synchronously presented without departing from the scope of the present disclosure (e.g., a base content as well as multiple companion contents). In addition, in some embodiments, one or more receiving computing devices associated with one or more users may receive the content synchronization information and utilize the content synchronization information to present the companion content and/or supplemental content.

As an illustrative, non-limiting example, a user may obtain access to a companion content pair (e.g., an eBook formatted for an eBook reader and a corresponding movie adaptation). More specifically, the user may initially obtain a base content, such as an eBook of *The Adventures of Huckleberry Finn*, and store the eBook on the user's eBook reader. In some instances, a movie adaptation of *The Adventures of Huckleberry Finn* may become available after the user obtains the base content. Yet, in other instances, a movie adaptation of *The Adventures of Huckleberry Finn* may already be available when the user obtains the base content. The user may then obtain or gain access to this companion content, e.g., a movie adaptation of *The Adventures of Huckleberry Finn*, via a separate transaction, which can include purchasing, lending, sharing, transferring, subscribing, or any combination thereof. For example, the user may subscribe to an electronic movie service which allows movies or movies to be streamed or downloaded to a user computing device. After the movie adaptation and the eBook are obtained or accessible to the user, the user may desire to enable interchangeable playback of the eBook and the companion movie.

With regard to the example given above, describing an eBook version of *The Adventures of Huckleberry Finn* and a corresponding movie adaptation, a related content management system can identify that these items of content constitute a content match (e.g., a base content and a companion content). The content management system may thereafter generate content synchronization information, enabling a device of the user to playback the companion content beginning from the last consumed point of the base content. Illustratively, the related content management system may be implemented by one or more computing devices, which may, in some instances, include any computing device(s) associated with the user. The information regarding base and companion content may be obtained, for example, from network resources, such as an external data source that includes purchase information associated with a user or user account, and/or from information the user shares from a computing device, such a list of content available to the computing device.

Though the example given above refers to companion content, a base content and supplemental content may be similarly decoupled. For example, a user a purchase *The Adventures of Huckleberry Finn*, and at a later point in time, acquire or gain access to an item of supplemental content referenced by or sharing subject matter with the base content. Similarly to as discussed above, a content management system may generate content synchronization information, enabling a device of the user to playback the supplemental content during consumption of the base content, or at a later point in time.

In addition to identifying a content match, the content management system can also identify a computing device associated with the user that can present companion content or supplemental content, such as a television, DVR, or laptop of the user. A particular version of the content synchronization information may be transmitted to the identified device in order to be compatible with the companion content and/or supplemental content that are presented using the identified computing device and/or be compatible with identified computing device itself. For example, a different version of content synchronization information may be provided to a television versus a laptop, based on different formats used to visually present the companion content, such as a movie. The identified computing device may already store the companion content or supplemental content, or the content management system may cause at least a portion of the companion content or supplemental content to be transmitted to the identified computing device.

Illustratively, with a companion content and the content synchronization information available to one or more computing devices, the computing devices can interchangeably present the companion content pair to provide the user with an enhanced content consumption experience. For instance, as described above, the user may read an eBook of *The Adventures of Huckleberry Finn* and be enabled to begin consumption of the movie adaptation from the point of last consumption of the eBook. Further, with a supplemental content and the content synchronization information available to one or more computing devices, the computing devices may identify the existence of supplemental content during consumption of the base content to provide the user with an enhanced content consumption experience. For instance, as described above, the user may read an eBook of *The Adventures of Huckleberry Finn* and be notified of the existence of (and provided access to) supplemental content referencing similar subject matter.

Though generally described above with reference to interchangeable presentation, in some embodiments, synchronous presentation may also be facilitated by synchronization information. For example, a user may wish to view a movie adaptation of an eBook while monitoring the eBook text itself (e.g., to locate differences or inconsistencies between the base content and the companion content). As such, a companion content may play on a user computing device, while the eBook is displayed and synchronized on the same or a different user computing device. Such synchronization may include, for example, turning the pages of the eBook during consumption of the movie. As a further example, some audio books may contain portions which are sourced from original video files (e.g., if an audio book references or plays back a portion of a television show or movie). Accordingly, embodiments of the present disclosure may be utilized to synchronously playback the original video file in conjunction with the audio book. Moreover, in some embodiments, a user may be enabled to identify companion content for future consumption. For example, a user may bookmark portions of a base content, and thereafter, corresponding portions of the companion content may be delivered to the user's device for later consumption.

Further, while reference may generally be made to movie adaptations or video files, the current disclosure should not be limited to pure adaptations, authorized adaptations, or any other specific type of companion content. For example, companion content may include, but is not limited to, fan-generated content and made for television video (e.g., a television series adaptation, a miniseries, or a made for television movie). In addition, supplemental content may include any content referenced by or sharing subject matter with a base content, including but not limited to, movies, television shows, documentaries, educational videos, interviews, commentaries (e.g., by an author, critic, or other part), fan generated content, spin-offs, retellings, and derivative works. For example, supplemental content may correspond to the same general content or story as a base content, but may be told from a different point of view. Moreover, supplemental content may include content describing side characters or minor characters of a base content in greater detail.

With reference now to FIG. 1, a block diagram depicting an illustrative content management environment 100 for use in identifying companion content and supplemental content related to a base content, generating content synchronization information for both companion content and supplemental content, and managing the content synchronization information will be described. As illustrated in FIG. 1, the content management environment 100 includes a related content management system 102, one or more computing devices 104, and one or more network data sources 108 in communication via a network 106, as well as a content data store 120 in communication with the content management system 102 (e.g., via a network). The network 106, in addition to any of the networks described herein, may be any wired network, wireless network or combination thereof. In addition, any of the networks described herein may be a personal area network, local area network, wide area network, cable network, satellite network, cellular telephone network, etc., or any combination thereof.

As illustrated in FIG. 1, the content management environment 100 can include one or more computing devices 104 for presenting content to a user. In an illustrative embodiment, the computing devices 104 can include various hardware and/or software components for obtaining and presenting digital content to a user, including, but not limited to, browser software applications, image viewing software applications, electronic publication viewing software applications, audio and/or video media playing software applications, and the like. The computing devices 104 can correspond to a wide variety of devices or components that are capable of initiating, receiving or facilitating communications over a communication network and/or presenting content. The computing devices 104 can include, but are not limited to, a laptop, personal computer, a tablet computer, personal digital assistant (PDA), hybrid PDA/mobile phone, mobile phone, electronic book reader, digital media player, television, DVR, one or more processors, integrated components for inclusion in computing devices, appliances, electronic devices for inclusion in vehicles or machinery, gaming devices, and the like. One example of a computing device 104 will be described in more detail with respect to FIG. 3, below.

With continued reference to FIG. 1, the content management system 102 can include an external data source interface component 112, a computing device interface component 114, a companion content identification module 116, a companion content management module 118, a supplemental content identification module 122, and a supplemental content management module 124. Illustratively, the external data source interface component 112 may be utilized for obtaining content information from network-based resources, such as the network data sources 108. Further, the computing device interface component 114 may be utilized for obtaining content information from computing devices 104. The content information obtained from the network data sources 108 and/or the computing devices 104 may include any information that can be used to identify a content match and/or a device to send content synchronization information. For instance, the content information may include information that identifies content, information associating content with a user or group of users, and/or information related to the content itself. By obtaining content information from different sources and/or at different points in time, the content management system 102 can be used to gather data related to decoupled content. In this way, the content management system 102 can identify relationships between decoupled content that may otherwise be unknown due to the decoupled nature of the content.

The content management system 102 can also include a companion content management module 116 for identifying a content match, identifying a computing device 104 to transmit content synchronization information to, and causing transmission of content synchronization information to one or more computing devices 104 via the network 106, or any combination thereof. The external data source interface component 112 and the computing device interface component 114 may be utilized to cause the transmission of information to the one or more network data sources 108 and/or one or more computing devices 104, respectively. Illustrative embodiments of interaction including the companion content management module 116 will be described in more detail with respect to FIG. 2A below.

The content management system 102 can also include a companion content identification module 118 for processing the content information from the network data sources 108 and determining which contents are companion content that can be synchronized (e.g., a base content and one or more companion contents). The companion content identification module 118 may use a product identifier and/or metadata (e.g., title, author, edition, etc.) related to a base content in order to determine other content which constitutes companion content. For instance, such information can be used to determine a movie or video exists that corresponds to *The Adventures of Huckleberry Finn* eBook or audio book. In some implementations, the companion content identification module 118 may further process the content information to identify companion content by applying filtering, spell/grammar check, and any other suitable automated algorithms. In addition, the companion content identification module 118 can incorporate additional reference materials to identify a content match, for instance, by accessing a uniform resource identifier.

Further, the companion content identification module 118 may compare pairs or other combinations of content to determine whether each pair/combination constitutes companion content, for example, by correlating each pair/combination of content in a common format. More specifically, if the content information corresponds to information related to the presentation of a specific representation of content (e.g., a movie or video), the companion content identification module 118 may translate at least a portion of the content into a format corresponding to a different version of the content (e.g., translating audio of the movie or video into a specific eBook format) and/or into a generic format (e.g., text). The formatted content information can be correlated with other content information to determine whether each pair of content corresponds to companion content that can be synchronized. In other implementations, the companion content identification module 102 may prompt a user to enter data (e.g., title, author, edition, etc.) for one or more base contents. The companion content identification module 116 may compare the data in order to identify corresponding companion content. In yet other implementations, the companion content identification module 118 may prompt a user to confirm that the base and companion content are indeed a companion content pair.

Though automated mechanisms for identifying a companion content pair are described herein, embodiments of the present disclosure may utilize manual or semi-manual methods in conjunction with or exclusive of automated mechanisms. For example, in some embodiments, one or more parties may manually classify an item of content as companion content to a given base content. Accordingly, a producer or other entity associated with a movie adaptation of the eBook may classify the movie adaptation as companion content to the eBook. As a further example, a distributer or other entity associated with sale of an eBook or movie adaptation may classify the items as a companion content pair. Still further, general users of a system (such as the content management system herein) may identify items as constituting a companion content pair. One skilled in the art will appreciate that a multitude of voting or crowd-sourcing techniques may be utilized to aggregate or filter input from a variety of sources.

In some instances, even though a base content and a companion content may be a companion content pair, the base content may not correlate exactly to the companion content. For example, the eBook of *The Adventures of Huckleberry Finn* may not exhibit a one-to-one correspondence to a movie adaptation of the original text, due to differences between the script of the movie and the text of the eBook, stylistic or editing differences, etc. Due to the existence of such uncorrelated portions of potential companion content, the companion content identification module 116 can be configured to identify companion content pairs amongst combination of content that include mismatching portions. Illustrative examples of routines for correlating mismatched content will be described in more detail with reference to FIG. 4A below.

With continued reference to FIG. 1, the content management system 102 can further include a supplemental content management module 124 for identifying a content match between base content and supplemental content, identifying a computing device 104 to transmit supplemental content synchronization information to, and causing transmission of supplemental content synchronization information to one or more computing devices 104 via the network 106, or any combination thereof. The external data source interface component 112 and the computing device interface component 114 may be utilized to cause the transmission of information to the one or more network data sources 108 and/or one or more computing devices 104, respectively. Illustrative embodiments of interaction including the supplemental content management module 124 will be described in more detail with respect to FIG. 2B below.

The content management system 102 can also include a supplemental content identification module 122 for processing the content information from the network data sources 108 and determining which contents constitute supplemental content to a given base content. The supplemental identification module 122 may use a product identifier and/or metadata (e.g., title, author, edition, etc.) related to a base content in order to determine other content which constitutes supplemental content. For instance, such information can be used to determine videos or other content which reference the base content or subjects of the base content. In some implementations, the supplemental content identification module 122 may further process the content information to identify supplemental content by applying filtering, spell/grammar check, and any other suitable automated algorithms. In addition, the supplemental content identification module 122 can incorporate additional reference materials to identify a content match, for instance, by accessing a uniform resource identifier.

In some embodiments, the supplemental content identification module 122 may identify supplemental content based on portions of a base content. For example, the supplemental content identification module 122 may be configured to select certain words or phrases of a base content (e.g., an eBook or an audio book), and perform a search algorithm to determine one or more items of supplemental content. Such a search algorithm may utilize, for example, a search engine. Search engines are well known in the art, and therefore will not be described in detail herein. In some embodiments, a search algorithm may identify a relevancy of a search result (e.g., as a percentage of potential relevancy). In some such embodiments, the supplemental content identification module 122 may be configured to identify only results above a given relevancy as supplemental content. In other embodiments, the supplemental content identification module 122 may identify only the top search result as supplemental content. Where supplemental content is found based on searching a certain word or phrase within a base content, the supplemental content may be linked to that specific word or phrase.

In other embodiments, the supplemental content identification module 122 may identify supplemental content relevant to the entirety of a base content. For example, the supplemental content identification module 122 may identify interviews with the author of an eBook, reviews or commentary regarding an eBook, or other supplemental content regarding an eBook (or other base content). Similar to the discussion above, the supplemental content identification module 122 may utilize search algorithms, such as by use of a search engine, to identify such supplemental content. Generally, supplemental content regarding the entirety of a base content may be accessible at a given point within the base content (e.g., a special section within an eBook that displays supplemental content), or at any point within the base content. Further examples of routines for identifying supplemental content will be discussed with reference to FIG. 4B, below.

Though automated mechanisms for identifying a supplemental content pair are described herein, embodiments of the present disclosure may utilize manual or semi-manual methods in conjunction with or exclusive of automated mechanisms. For example, in some embodiments, one or more parties may manually classify an item of content as supplemental content to a given base content. For example, a producer or other entity associated with a documentary or video of a subject discussed within an eBook may classify the documentary or video as supplemental content to the eBook. As a further example, a distributer or other entity associated with sale of an eBook, documentary, or video may classify the items as a supplemental content pair. Still further, general users of a system (such as the content management system herein) may identify items as constituting a supplemental content pair. One skilled in the art will appreciate that a multitude of voting or crowd-sourcing techniques may be utilized to aggregate or filter input from a variety of sources.

In some embodiments, the content management system 102 can also cause a notification to be sent in response to identifying a new item of either companion content or supplemental content. For example, when a new item of companion content becomes available (e.g., a new movie adaptation of *The Adventures of Huckleberry Finn*), a notification that companion content is available can be sent to users who already own corresponding base content (e.g., *The Adventures of Huckleberry Finn* eBook). As a further example, when a new item of supplemental content is identified (e.g., a new documentary regarding civil liberties in Pre-Civil War America), a notification may be sent to users who own corresponding base content, or users who have previously expressed interest in the subject matter. Such a notification can be sent, for example, via electronic mail, push notification, telephony message, automatic download request or any network messaging or communication protocol available between a computing device and the content management system 102. The notification can be sent to a computing device that is configured to present content and/or that stores the corresponding content. This notification may be used by the computing device to inform and/or assist a user in obtaining the companion content via purchase (e.g., via a browser used to navigate an electronic shopping service that offers the companion content for sale), lending, sharing, and/or transfer of ownership services. Further, notifications, messages, and/or other communications regarding companion content can be sent in a variety of other contexts. Some example contexts can include a user browsing available content before the user has access to any of the content, and sending a user a promotional offer to sample companion content (e.g., a chapter of an eBook and a segment of a corresponding movie or video) or supplemental content (e.g., a chapter of an eBook and a segment of a related documentary).

Though generally described herein with reference to supplemental content that is immediately or substantially immediately available for acquisition by an end user, in some embodiments, supplemental content may correspond to indications or placeholders that additional content may become available in the future. For example, an author of a base content (e.g., a novel) referencing a minor character may intend, at a later point in time, to create additional content regarding that character. As such, supplemental content may include an indication that the additional content will become available at a point in the future. Further, such supplemental content may be modified at the time of release of the additional content, such that the notification or placeholder is replaced with the additional content. Illustratively, following the previous example, at the point that an author releases additional content regarding the minor character, that content may then constitute supplemental content to the original novel, and the placeholder or notification may be removed. Moreover, future content may not be required to come from the original author of a base content, but may include planned content identified by publishers, distributors, users, or any other entity. In some embodiments, future content placeholders may be used to identify interest in additional content. For example, an author may include a placeholder to a potential additional content in order to gauge interest in the content (e.g., by tracking user selection of the placeholder).

The content management system 102 can further be associated with the content data store 120 for storing content information obtained by the external data source interface component 122, utilized and/or generated by the content management system 102. The content data store 120 may store content information used to determine whether content is either companion content or supplemental content, data identifying companion content pairs or supplemental content pairs, and additional information. For instance, the content data store 120 may store a list, database, or other suitable data structure that identifies companion content and/or supplemental content as determined by the content management system 102.

The content management system 102 may be operable on one or more computing devices, such as virtual or physical server computing devices, cloud nodes, client computing devices, and/or mobile computing devices. Additionally, the external data source interface component 122 and/or the companion content identification module 116 may be implemented in a single computing device or across multiple computing devices. Likewise, although the content data store 120 is illustrated as local to the content management system 102, the data store 120 can correspond to a distributed data store and/or a network based data store. The content management system 102 may include any one of a number of additional hardware and/or software components that would be utilized in the illustrative computerized network environment to carry out the illustrative functions of the content management system 102 and/or any of the individually identified components.

Figure 2A:
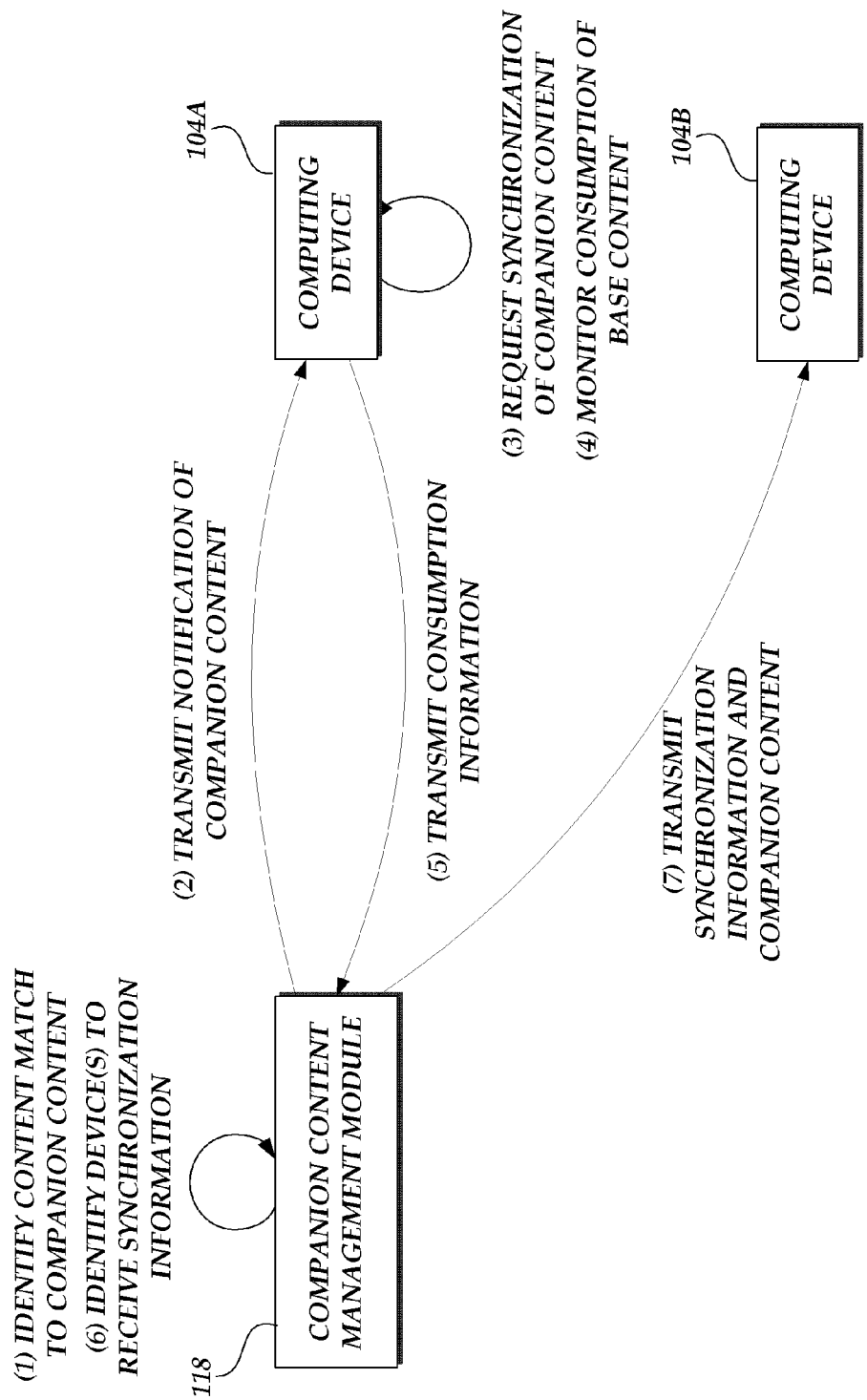
FIG. 2A is a block diagram depicting a companion content management module of a content management system shown in FIG. 1 receiving consumption information for a base content, identifying a content match to companion content, and transmitting the companion content as well as synchronization information to a computing device associated with a user.

Referring to FIG. 2A, one illustrative interaction for providing synchronization information related to companion content will be described. At (1), the companion content management module 118 of FIG. 1 may identify a content match between at item of base content (e.g., an item previously acquired by a user) and one or more items of companion content. The companion content management module 118 may identify such a content match, for example, in conjunction with the companion content identification module 116 of FIG. 1, or by use of data previously generated by the companion content identification module 116. In some embodiments, companion content pairs can be identified in response to gathering new content information (e.g., the purchase of a new item of base content by a user), or may be identified at predetermined intervals of time (e.g., every day, week, etc.). Alternatively or additionally, companion content pairs can be identified from information available to the content management system 102 on demand in response to a user request or system generated event obtained via the network 106. For example, in some instances, a user may begin to consume a base content, and companion content may be determined and/or presented to the user in real time or substantially real time.

Thereafter, at (2), the companion content management module 118 may notify a user computing device 104A (e.g., an illustrative user computing device 104 of FIG. 1) of the availability of the companion content. Such a notification may enable a user of the computing device 104A to decide whether to synchronize a base content and the items of companion content, and if so, to which devices the companion content should be synchronized. Illustratively, the computing device 104A may correspond to an eBook reader holding a copy of *The Adventures of Huckleberry Finn*. The user of the computing device 104A may be prompted that a movie adaptation of the eBook exists, and that it is possible to synchronize this movie adaptation (or portions thereof) to the user's other computing devices (such as computing device 104B, which may correspond to a DVR, a television, a laptop, or any other computing device capable of displaying video). In some embodiments, the computing device 104A may also be capable of displaying video content, and as such, the companion content may be synchronized on the computing device 104A. One example of a user interface for notifying a computing device 104A that companion content may be synchronized will be described in more detail with respect to FIG. 5, below.

In response to a notification that companion content is available, the computing device 104A, at (3), may request synchronization information regarding the base content and the companion content. Illustratively, this may correspond to a user request to synchronize a companion content pair, such as in response to a notification that companion content exists. In the illustrative interaction of FIG. 2A, the user may request that companion content by synchronized to the computing device 104B (e.g., their DVR or their personal computer).

Thereafter, at (4), consumption of base content may be monitored in order to facilitate synchronization of the companion content. Such monitoring may correspond to a determination of the current position of consumption of a base content (e.g., a currently read word, sentence, or page of an eBook, or a current playback position of an audio book). As described above, a position of consumption of a base content may be monitored based on, for example, physical input of the user (e.g., touch input indicating a current position), the frequency of page turns within content, the eye movement of a user (to determine a currently read word), or voice recognition (e.g., if the user is reading out loud).

At (5), consumption information may be transmitted to the companion content management module 118. Illustratively, the consumption information can identify a current position of consumption of the base content on the computing device 104A (e.g., based on the previously performed monitoring). The consumption information may be utilized by the companion content management module 118 to determine a starting position of playback within the companion content. For example, if a user stopped reading an eBook at page X, the companion content management module may instruct the computing device 104B to begin playback of the companion content (e.g., a movie adaptation of the eBook) at a point corresponding to page X.

At (6), the companion content management module 118 may identify a receiving computing device 104 (such as computing device 104B) to receive synchronization information. In this illustrative embodiment, the companion content management module 118 may identify the computing device 104B to receive synchronization information based on the user selection of receiving computing devices 104, discussed above. Generally, synchronization information may refer to any information that enables synchronous playback of a base content and a companion content. Synchronization information may be generated by the companion content identification module 116, as will be described in more detail below with respect to FIG. 4A. Illustratively, synchronization information may include a mapping of portions of a base content to portions of a companion content. For example, each point within an eBook (or range of points within an eBook) may be mapped to a point within a movie adaptation of the eBook.

Thereafter, at (7), the synchronization information may be transmitted to the computing device 104B. As such, the computing device 104B may be enabled to begin playback of the companion content from a point corresponding to a last consumed point of the base content. Illustratively, transmission of synchronization information may enable a user to halt consumption of a base content and immediately (or substantially immediately) begin viewing companion content on the computing device 104B.

In some embodiments, the receiving computing device 104 may receive synchronization information without obtaining access to any portion of content of a companion content pair associated with the synchronization information and/or prior to obtaining access to any portion of content of a companion content pair associated with the synchronization information. For example, the synchronization information may be transmitted with an offer to obtain the companion content, such that when a user utilizes the computing device 104B, the user is enabled to obtain the companion content. In some instances, this offer may require the user to purchase the companion content. In other instances, the user may already have access to the companion content (e.g., via a subscription server), and as such, no additional payment would be required.

In other embodiments, the companion content management module 118 may be enabled to transmit all or a portion of the companion content to the receiving computing device 104B. For example, where the user has access to the companion content (e.g., the user has already purchased the companion content or the companion content is free) the companion content management module 118 may be configured to transmit the companion content to the computing device 104B prior to or simultaneous to transmission of the synchronization information. In some embodiments, the companion content management module 118 may be configured to detect whether the computing device 104B already has access to the companion content, and transmit the companion content (or a relevant portion thereof) only if the computing device 104B does not already have access to the content.

In still more embodiments, the companion content may be available to, but not stored on, the receiving computing device 104B. For example, the companion content may be a video or movie stored on a remote data store device (e.g., network data stores 108 of FIG. 1). These network data stores 108 may be configured to stream the companion content to the computing device 104B in real time or substantially real time. As such, the computing device 104B may not be required to store the companion content itself.

Figure 2B:
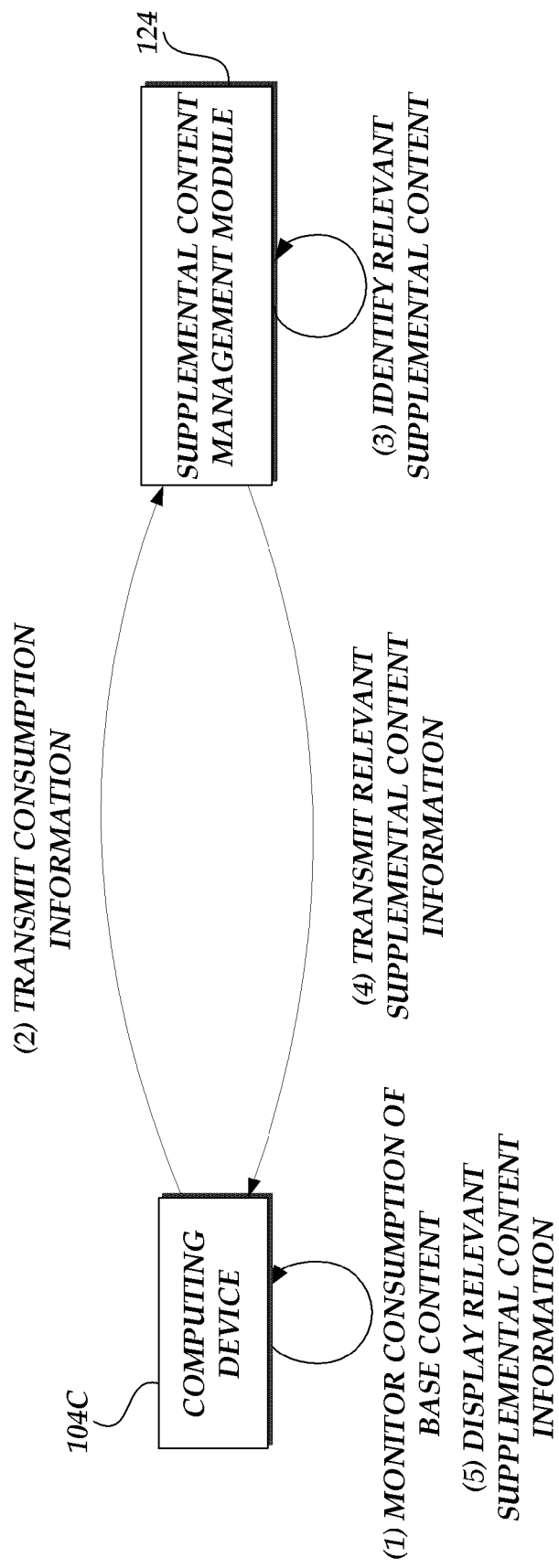
FIG. 2B is a block diagram depicting a supplemental content management module of the content management system shown in FIG. 1 receiving consumption information for a base content, identifying a content match to supplemental content, and transmitting the supplemental content as well as synchronization information to a computing device associated with a user.

Referring to FIG. 2B, one illustrative interaction for providing synchronization information for supplemental content will be described. The illustrative interaction of FIG. 2B may include a user computing device 104C, which may correspond to any of the computing devices 104 of FIG. 1 described above. For the purposes of FIG. 2B, it is assumed that the user of the computing device 104C has acquired a base content, such as an eBook or audio book of *The Adventures of Huckleberry Finn*, and has further requested that information regarding supplemental content (e.g., videos, documentaries, etc., which related to subject matter discussed in the eBook or audio book) be delivered to the computing device 104C. It is further assumed that the computing device 104C is capable of outputting both the base content and the supplemental content. For example, computing device 104C may correspond to a personal computer, a tablet, or a mobile phone. In some embodiments, however, supplemental information may be delivered to a separate computing device 104, such that the computing device 104C may not be required to output both a base content and a supplemental content. For example, the computing device 104C may be an eBook reader capable of outputting an eBook, but not capable of outputting supplemental video content. As such, the user may request that this supplemental content be delivered to a separate computing device (not shown in FIG. 2B).

With continued reference to FIG. 2B, at (1), consumption of base content may be monitored in order to facilitate synchronization of the companion content. As discussed above with reference to FIG. 2A, such monitoring may correspond to a determination of the current position of consumption of a base content (e.g., a currently read word, sentence, or page of an eBook, or a current playback position of an audio book). As also described above, a position of consumption of a base content may be monitored based on, for example, physical input of the user (e.g., touch input indicating a current position), the frequency of page turns within content, the eye movement of a user (to determine a currently read word), or voice recognition (e.g., if the user is reading out loud).

At (2), consumption information may be transmitted to the supplemental content management module 124. As described above with respect to FIG. 2A, the consumption information can identify a current position of consumption of the base content on the computing device 104C (e.g., based on the previously performed monitoring).

At (3), the consumption information may be utilized by the supplemental content management module 124 to determine relevant supplemental content related to a current consumption position of the base content. For example, in some embodiments, supplemental content may be identified that relates to certain words, sentences, or paragraphs within the currently consumed portion of the base content. The supplemental content management module 124 may identify such supplemental content, for example, in conjunction with the supplemental content identification module 122 of FIG. 1, or by use of data previously generated by the supplemental content identification module 122. Identification of supplemental content by the supplemental content identification module 122 will be discussed in more detail with respect to FIG. 4B, below.

Thereafter, at (4), the relevant supplemental content information may be transmitted to the computing device 104C. As such, at (5) the computing device 104C may be display information regarding relevant supplemental information during output of the base content. For example, the computing device 104C may highlight words, sentences, or paragraphs within the base content that are associated with supplemental content. One example of a user interface for identifying relevant supplemental information to a user is described below with reference to FIG. 6. As will be described below, in some embodiments, the computing device 104C may be configured to retrieve supplemental content based on user selection of a corresponding word, sentence, or paragraph, and to display supplemental content. For example, a user may read the eBook *The Adventures of Huckleberry Finn*, select a word related to a given subject, and immediately (or substantially immediately) view a documentary or other video regarding the subject. In other embodiments, the user may be enabled to select an item of supplemental content for future output. For example, the user may be able to add the supplemental content to a queue for future viewing. In still more embodiments, the user may be enabled to output supplemental content on a distinct computing device. For example, the user may select an item of supplemental content on an eBook reader, and the supplemental content or information related to the content may be sent to a DVR (not shown in FIG. 2B) for playback.

In some embodiments, the supplemental content management module 124 may send items of supplemental content to a selected computing device, such as computing device 104C, in order to enable the computing device to playback the supplemental content. Transmission of supplemental content may occur at any point prior to output of the supplemental content. For example, supplemental content may be transmitted to a computing device on user selection of the supplemental content (e.g., while consuming a base content) or simultaneously with transmission of the relevant supplemental content information. In still more embodiments, the supplemental content management module 124 may transmit other access information to a computing device (such as computing device 104C or anther user computing device 104) to enable the computing device to access the supplemental information. Access information may include, for example, a uniform resource locator (URL) to the supplemental information, or any other information that enables a computing device to access or obtain the supplemental information.

Figure 3:
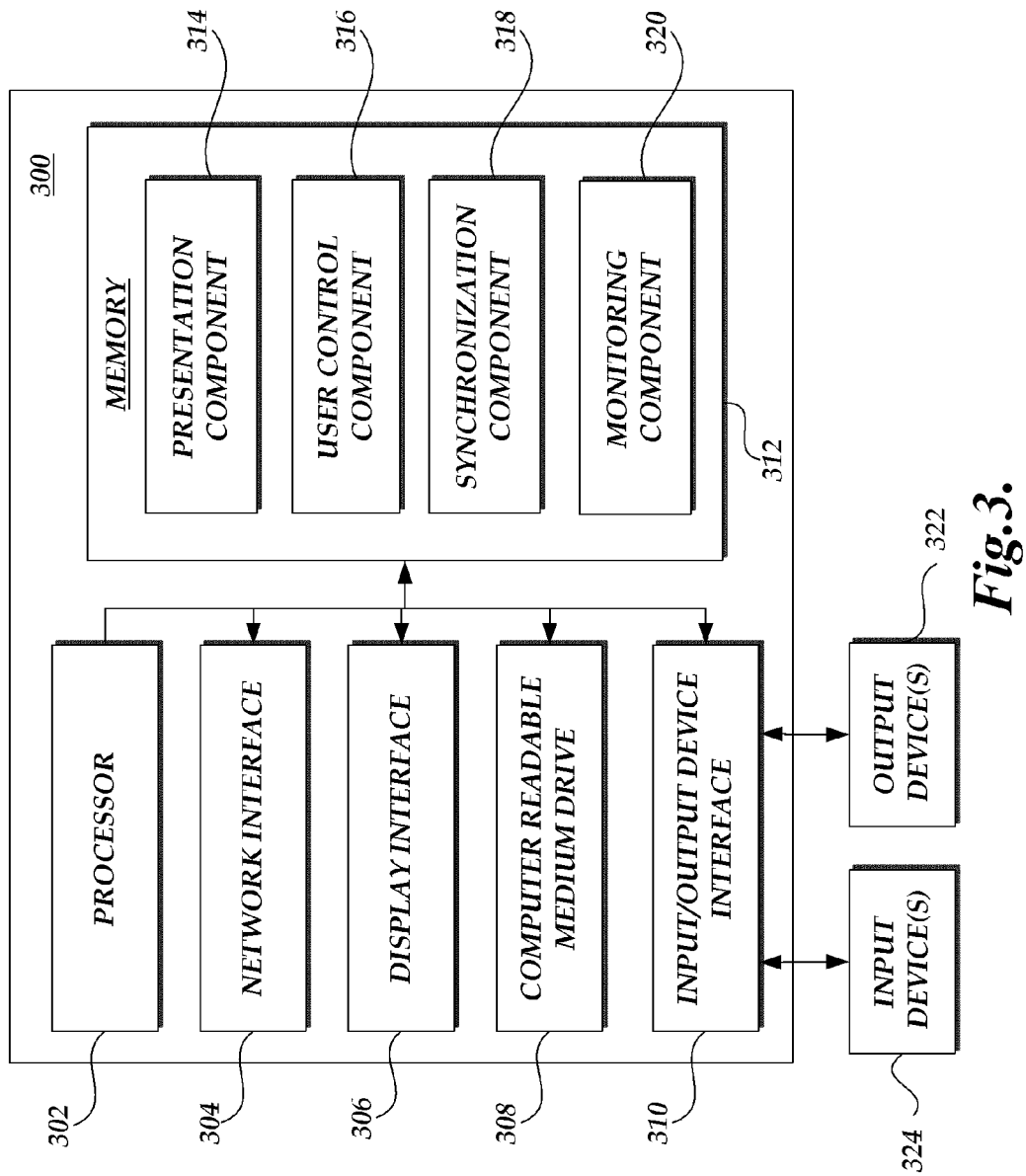
FIG. 3 is a block diagram depicting an illustrative embodiment of a computing device configured to implement playback of companion content as well as supplemental content.

FIG. 3 is a block diagram illustrating an embodiment of a computing device 300 configured to implement playback of base content, companion content, and supplemental content, such as computing device 104 of FIG. 1. Though reference will be made herein to a device that may playback all of base content, companion content, and supplemental content, in some embodiments, a device may be operable to playback less than all of base content, companion content, and supplemental content. For example, a device may operable to playback only base content, only supplemental content, only companion content, or any combination therein. As described above, a user may utilize multiple devices in order to playback any combination of the above contents.

The computing device 300 may have one or more processors 302 in communication with a network interface 304, a display interface 306, a computer readable medium drive 308, and an input/output device interface 310, all of which communicate with one another by way of a communication bus. The network interface 304 may provide connectivity to one or more networks or computing systems. The processor(s) 302 may thus receive information and instructions from other computing systems or services via a network. The processor(s) 302 may also communicate to and from memory 312 and further provide output information or receive input information via the display interface 306 and/or the input/output device interface 310. The input/output device interface 310 may accept input from one or more input devices 324, including, but not limited to, keyboards, mice, trackballs, trackpads, joysticks, input tablets, track points, touch screens, remote controls, game controllers, heart rate monitors, velocity sensors, voltage or current sensors, motion detectors, cameras, microphones, or any other input device capable of obtaining a position or magnitude value from a user. The input/output interface may also provide output via one or more output devices 322, including, but not limited to, display devices, one or more speakers or any of a variety of digital or analog audio capable output ports, including, but not limited to, headphone jacks, ¼ inch jacks, XLR jacks, stereo jacks, Bluetooth links, RCA jacks, optical ports or USB ports, as described above. The display interface 306 may be associated with any number of visual or tactile interfaces incorporating any of a number of active or passive display technologies (e.g., electronic-ink, LCD, LED or OLED, CRT, projection, etc.) or technologies for the display of Braille or other tactile information.

Memory 312 may include computer program instructions that the processor(s) 302 executes in order to implement one or more embodiments. The memory 312 generally includes RAM, ROM and/or other persistent or non-transitory computer-readable media. Memory 312 may store a presentation component 314 for managing the output of information to a display and/or other output device(s) 322 via the display interface 306 and/or input/output interface 310. The memory 312 may further include a user control component 316 for managing and obtaining user input information received for one or more input device 324 via the input/output device interface 310. In one embodiment, the user control component 316 may additionally interpret user input information in order to monitor playback of a base content.

Memory 312 may further store a monitoring component 320. In one embodiment, the monitoring component 320 may be utilized to monitor the current presentation of a base content, in order to facilitate output of companion content and/or supplemental content. In one embodiment, the monitoring component 320 may utilize a touch screen or other physical input of the computing device 300 to receive an indication of the current position of consumption of the base content. For example, a user utilizing the computing device 300 may use their finger to indicate a currently read word within a base content. As such, the computing device 320 may monitor the location of consumption of the base content. In another embodiment, the monitoring component 320 may monitor other aspects of presentation of a base content in order to determine a current consumption position. For example, the monitoring component 320 may calculate an average consumption speed based on the page turn rate associated with the base content. The monitoring component 320 may estimate the current consumption position of the base content based on the monitored page turn rate. In still more embodiments, the monitoring component 320 may utilize other inputs 324 of the computing device 300 in order to monitor a consumption location of a base content. For example, the monitoring component 320 may utilize a camera input device 324 to track the eye movement of a user. This eye movement may be used to estimate the word viewed on a display output device 324 by the user. As such, the monitoring component 320 may estimate the current consumption position of base content by determining the position of the currently read word within the base content. As a further example, an audio input device 324 may be used to determine a current consumption position of base content. For example, the monitoring component 320 may utilize a text to speech process to determine the last spoken word, sentence, etc. by a user. By locating the last spoken word within the base content, a current consumption position within base content may be determined.

In addition, memory 312 may store a synchronization component 318. In one embodiment, the synchronization component 318 may interpret a synchronization file obtained from a local or network storage location (not shown) in order to facilitate interchangeable playback of base content and companion content, or to facilitate display of supplemental content or indicators that supplemental content exists. In one embodiment, the synchronization file contains content synchronization information associated with the companion content and/or supplemental content, and can be generated, transmitted, and/or obtained via computing devices in a communication network, such as from the content management system 102 of FIG. 1. As described above, the content synchronization information can include any data related to the synchronous and/or interchangeable presentation of the base content and the companion content, as well as data related to the applicability of supplemental content within a base content. Content synchronization information can include reference points mapping portions of the base content to corresponding portions of the companion content and/or supplemental content. In a specific example, content synchronization information can include data that can be used to map a segment of text (e.g., a word, line, sentence, etc.) to a timestamp of a corresponding companion video recording or movie, or to a corresponding documentary or video commentary. The synchronous presentation of the companion content or supplemental content can vary as a function of the capabilities and/or configuration of the device (e.g., an eBook reader vs. a DVR) and/or the formats of the content in the content pair (e.g., a digital publication and an audio recording vs. a video and an audio recording). Accordingly, the content synchronization information can be generated in a variety of formats, versions, etc. In addition, the content synchronization information can include any combination of features or data used to synchronize content disclosed in the '313 Application.

Though described above as a computing device which received information via a network (e.g., from a content management system 102 of FIG. 1), in some embodiments, a computing device 300 may include additional or alternative components which implement one or more of the functionalities of the content management system 102. As such, in some embodiments, a computing device 300 may not require connection to an external data source in order to implement embodiments of this disclosure.

Figure 4A:
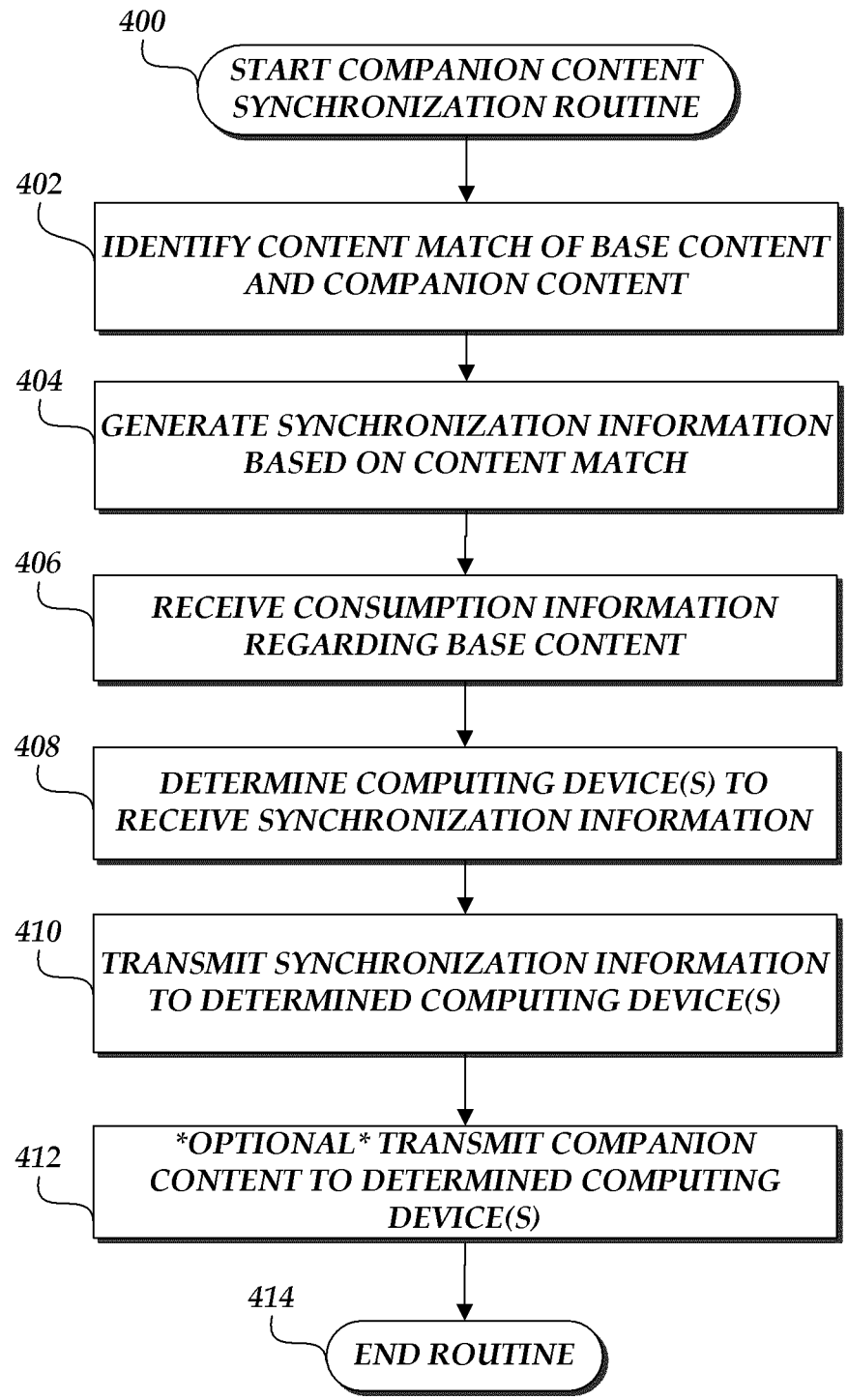
FIG. 4A is a flow diagram of an illustrative method of presenting synchronized companion content.

Referring to FIG. 4A, a flow diagram of an illustrative method 400 for enabling interchangeable presentation of a base content and companion content will be described. The method 400 may be utilized, for example, by the content management system 102 of FIG. 1. At block 402, a content match of a base content and companion content may be identified. A content match may be determined in whole or part by the companion content identification module 116 of FIG. 1. Illustratively, this content match may indicate that a given item of base content corresponds to one or more items of companion content. As described above, a content match may be identified based on a number of factors including, but not limited to, algorithmic determination of a content match or manual determination of a content match. For example, a manual determination of a content match may include a determination by the operator of the content management system 102 that a match exists, a determination by a content provider (e.g., associated with either the base content or the companion content) that a content match exists, or a determination by one or more users of the content management system 102 that a content match exists (e.g., utilizing voting or crowd-sourcing protocols).

As described above, in some embodiments, the companion content identification module 116 may use a product identifier and/or metadata (e.g., title, author, edition, etc.) related to a base content in order to determine other content which constitutes companion content. For instance, such information can be used to determine a movie or video exists which corresponds to *The Adventures of Huckleberry Finn* eBook or audio book. In some implementations, the companion content identification module 116 may further process the content information to identify companion content by applying filtering, spell/grammar check, and any other suitable automated algorithms. In addition, the companion content identification module 116 can incorporate additional reference materials to identify a content match, for instance, by accessing a uniform resource identifier.

After identifying a content match between a base content and a companion content (e.g., *The Adventures of Huckleberry Finn* eBook and a corresponding movie adaptation), the content management system 102 may generate synchronization information enabling interchangeable playback of the base content and the companion content. For example, synchronization information may map portions of a base content (e.g., a page, paragraph, or word number, or a position in an audio book) with portions of the companion content (e.g., a time stamp of the video content).

In some embodiments, base content and companion content may not correlate perfectly. For example, a movie adaptation may leave out descriptive text within an eBook, or entire portions of a text (e.g., for artistic, stylistic, or practical purposes). Although more detail will be provided below with reference to correlating portions of an eBook and a movie adaptation of the eBook, the concepts described may be applied to any application in which a base and companion content include mismatching portions. Despite differences between a companion content and a base content, companion content may include large portions of unmodified material that may strongly correlate with the base content. Accordingly, in some embodiments, the companion content identification module 116 may detect mismatches between a base content and a companion content using algorithms that solve "longest common sequence" problems, an implementation of which can be found, for example, in the UNIX "diff" operation. The companion content identification module 116 can then generate content synchronization information for the correlated portions of the different versions and provide the content synchronization information to the user's computing device for use when interchangeably presenting an eBook and a movie adaptation of the eBook. More specifically, the companion content identification module 116 can correlate unmodified material similarly to how an eBook and full or exact adaptation or recitation of the book into video may be correlated.

For passages of a movie or video with small-scale modifications, the companion content identification module 116 may correlate the modified material and generate an indicator that these portions include some mismatches. For example, a potential companion content pair (e.g., a base content and a companion content) can be converted into a common format, such as text and/or phoneme. In some embodiments, machine translation techniques may be utilized for such translation. Then an attempt to match content at a small scale (e.g., at a word level) can be performed. Since missing or added passages can include larger portions (e.g., whole sentences or paragraphs) that do not match, a passage mismatch score indicating the frequency of mismatches can be computed for sentences, paragraphs, and/or other units of text. For example, the passage mismatch score may represent a number and/or percentage of word mismatches for a larger portion of text (e.g., a sentence, paragraph, or page). Sequences of larger portions with similarly high mismatch frequencies compared with adjoining sequences (where "high" can be set empirically from analyzing correlation of known companion content) can be identified. These sequences may represent content that should not be synchronized with other content in a companion content pair. The high mismatch passages can be removed in either or both contents, and matching can be reattempted at a smaller scale (e.g., at the word level). Metadata can be generated based on the correlation(s) to determine alignment points for the content synchronization information. The metadata may also include information identifying reference points in at least one of the companion content at which a matching portion begins/ends.

In some embodiments, certain portions or classes of portions of a companion content may be more likely to correlate to a base content than other portions or classes of portions. For example, quotations or dialog within a base content may be more likely to directly correspond to quotations or dialog within companion content than descriptive language. Illustratively, a movie adaptation of an eBook may maintain a majority of dialog as audio content, but remove descriptive language (e.g., in favor of visual representation). As such, in some embodiments, the content identification module 116 may attempt to match quotations or dialog within a base content with audio information within a companion content. Further, formal names (e.g., character names or place names) may be indicative of a correlation between base content and companion content. Illustratively, a character may be introduced at a certain point within the base content (e.g., at 30% into the duration of an audio book). As such, the content identification module 116 may be configured to locate the first introduction of the character into a companion content, and attempt to map this location to the introduction within the base content. For example, the content identification module 116 may attempt to map the introduction (or removal) of non-standard words or phrases (e.g., non-dictionary words or phrases) in a base content over time, and compare an additional mapping created based on a companion content. Similarities in the mappings may indicate that the points within the base content and the companion content should be correlated.

Returning to FIG. 4A, the companion content identification module 118 may also determine a match score indicative of how well a base content correlates with a companion content. The match score may apply to the entire base content and companion content or to a subset thereof (e.g., a chapter, act, or part). The match score may be indicative of the overall quality of synchronously presenting the companion content, while the passage mismatch score described above may be useful in synchronously presenting the companion content, for example. The match score may be calculated like the passage mismatch score described above. In some instances, the match score can correspond to a percentage or ratio of any unit of the base content correlating to a corresponding unit of the companion content. In a specific example, the match score can be the percentage of dialog in an eBook that correlate to corresponding dialog in a movie adaptation of the eBook. The match score may be used to determine whether pairs of content constitute a companion content pair. For example, a minimum match score can be used as a threshold value for determining that two items of content constitutes a companion content pair for which content synchronization information will be generated.

Since portions of a base content and a companion content may not correlate with each other, the match score can be used to process base content and a companion content with varying ranges of correlations into any number of groups that can be processed differently. For example, using the match score, the companion content identification module 118 may synchronize an eBook with a corresponding movie adaptation. Accordingly, the user's computing device can automatically present base content and a companion content interchangeably when the match score satisfies a threshold and/or provide a subset of features related to synchronizing the base content and a companion content when the base content and a companion content has a match score below a predetermined threshold. Illustratively, a match score below a given level may result in an indication to a user that the base content and the companion content differ significantly.

Further, the combination of match score (indicative of an overall match of the base content and the companion content) may be utilized in conjunction with one or more mismatch scores (indicative of the match of portions of the base content to portions of the companion content) in order to provide greater control to an end user. For example, a low match score (e.g., indicating that a substantial portion of the base content and companion content differ) combined with a low average mismatch score (e.g., indicating that individual portions of each item of content generally match) may indicate a sequencing mismatch between the base content and the companion content. For example, a movie adaptation of an eBook may introduce characters, places, or ideas in a slightly different order than the eBook itself. As such, synchronization of the eBook and the film adaptation may require consuming at least one item outside of its intended order. In such instances, a user may be notified of the inconsistency, and may choose, for example, which item to view out of order.

As described above with respect to identification of companion content, though automated mechanisms are described herein, embodiments of the present disclosure may utilize manual or semi-manual methods in conjunction with or exclusive of automated mechanisms. For example, in some embodiments, one or more parties may manually create synchronization information for a companion content pair (e.g., a producer, a distributor, or an end user). One skilled in the art will appreciate that a multitude of voting or crowd-sourcing techniques may be utilized to aggregate or filter input from a variety of sources.

After synchronization information correlating the base content and the companion content has been generated, the content management system 102 may receive, at block 406, consumption information regarding the base content. Consumption information may be received, for example, from a computing device 104 outputting the base content. As described above, consumption information may identify a last consumed portion of a base content.

At block 408, the companion management system 102 may identify a receiving computing device to receive synchronization information. For example, a computing device may be identified based on user selection (e.g., via a user interface). One illustrative user interface for receiving such a user selection will be described in more detail with reference to FIG. 5 below. In some embodiments, the receiving computing device may be the same computing device from which consumption information was received. This may occur, for example, if a computing device may output both a base content (e.g., an eBook), and companion content (e.g., a corresponding video). In other embodiments, the received computing device may be different than the computing device from which consumption information was received. For example, a user may consume a base content via an eBook reader, but desire to consume companion content via a television or laptop.

At block 410, the previously generated synchronization information as well as consumption information may be transmitted to the determined computing devices. Illustratively, the synchronization information may include mappings of base content to companion content. In embodiments in which the determined computing device is not the same computing device from which consumption information was received, the synchronization information may further include a position of last consumption of the base content. As such, the receiving computing device may utilize the synchronization information to determine a point of playback within the companion content that corresponds to a last consumed position in the base content.

Optionally, at block 412, the content management system 102 may transmit the companion content or a portion thereof to the determined computing devices. Illustratively, if the determined computing device corresponds to a DVR, the content management system 102 may transmit or queue all or a portion of the companion content to the DVR. In other embodiments, the determined computing devices may already have access to a copy of the companion content. For example, the determined computing devices may have previously stored the companion content, or the companion content may be available for streaming from a network data source. In these embodiments, block 412 may be omitted. Thereafter, the routine 400 may end at block 414.

By use of the routine 400, a user may be enabled to interchangeably playback a base content and companion content. Illustratively, a user may pause or halt reading of *The Adventures of Huckleberry Finn* eBook on a first computing device (e.g., an eBook reader), and the receiving computing device (e.g., a DVR) may enable the user to begin playback of the corresponding movie adaptation at a point corresponding to the last read page of the eBook. As a further example, a user may halt reading of an eBook on a tablet or laptop computing device, and begin playback of a companion video at a corresponding point. The user may further be enabled to alternate between playback of the base content and the companion content as desired. In some embodiments, a user may be enabled to begin consumption of a companion content (e.g., a video adaptation of an eBook), and later consume the eBook from the last watched portion of the companion content.

Figure 4B:
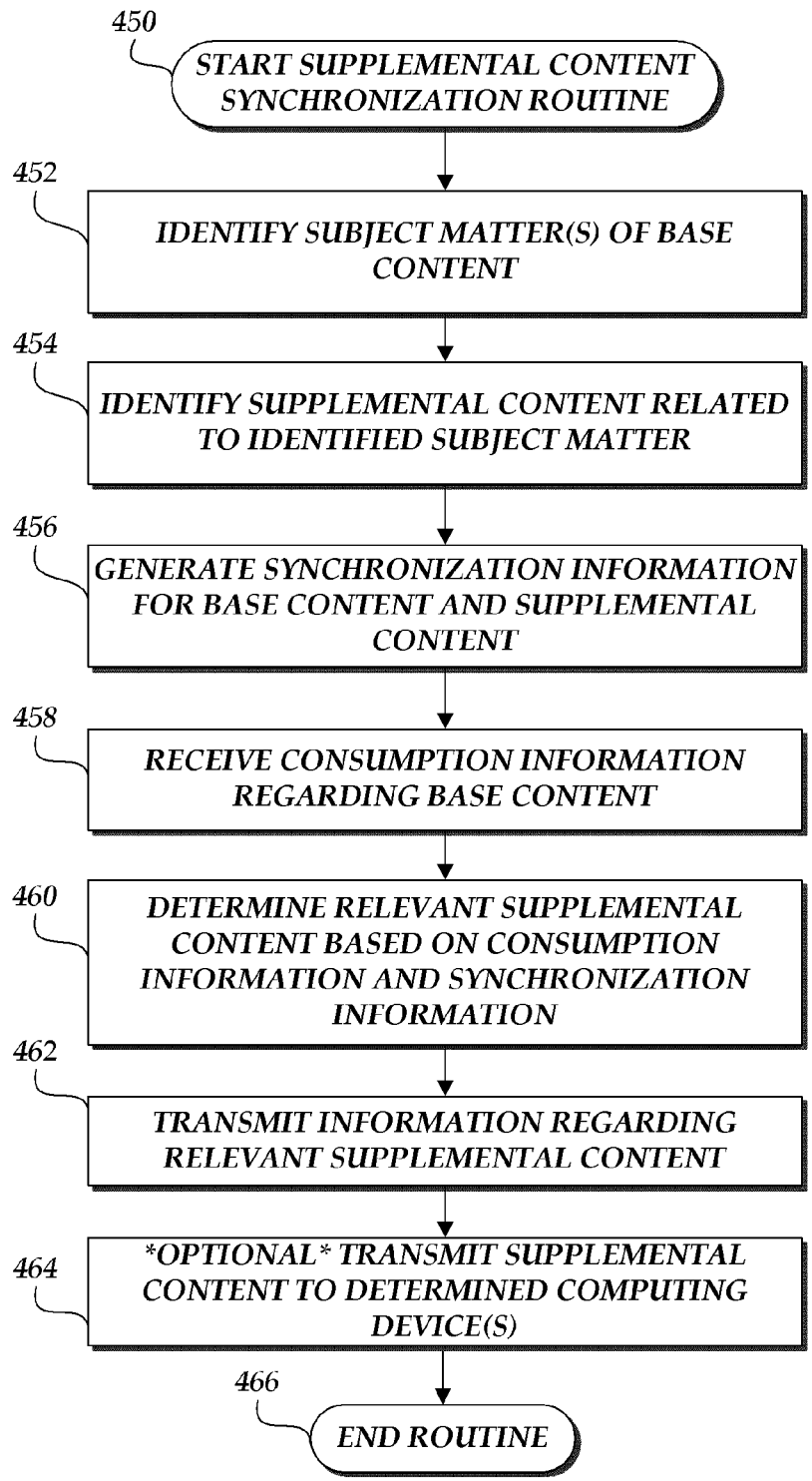
FIG. 4B is a flow diagram of an illustrative method of presenting supplemental content.

With reference to FIG. 4B, a flow diagram of an illustrative method 450 for enabling presentation of a base content and supplemental content will be described. The method 450 may be utilized, for example, by the content management system 102 of FIG. 1. Though described herein with reference to a single base content, such as the eBook of *The Adventures of Huckleberry Finn* the illustrative routine 450 may be carried out for any number of base contents.

At block 452, one or more subject matters of a base content may be identified. As described above, subject matter may refer generally to a topic or subject referenced a base content (e.g., the base content in its entirety, or a portion of the base content). For example, *The Adventures of Huckleberry Finn* may reference or contain subject matter such as Mark Twain, the nineteenth century, youth activities in the south, civil liberties in Pre-Civil War America, southern colloquialisms, etc. Further, subject matter of *The Adventures of Huckleberry Finn* may be more general, such as satirical fiction, southern fiction, popular American literature, etc. Still further, subject matter may be identified based on only a portion of a base content, such as a word, sentence, or paragraph. For example, while *The Adventures of Huckleberry Finn* may not generally be directed toward discussion of plants or animal life, referencing within the eBook may contain such subject matter. As such, subject matter may generally refer to any subject or topic referenced by, discussed, or implicated by any portion of a base content.

In some embodiments, the amount of subject matter of a base content may become quite large. As such, suitable algorithms may be used to reduce the amount of subject matter to only the most relevant subject matter. This may include, for example, identifying general themes of a base content (e.g., by continued reference throughout the eBook) or identifying specific references to subjects within a base content (e.g., citation to a specific paper or topic). In this manner, supplemental content may be identified that is most relevant to the base content.

At block 454, supplemental content related to the previously identified subject matter may be identified. In some embodiments, search algorithms may be used to identify supplemental content in, for example, network data stores 108 or content data store 120 of FIG. 1. Supplemental content may be associated with the content management system 102, or otherwise unaffiliated with the content management system (e.g., provided by another entity). For example, one example of supplemental content of *The Adventures of Huckleberry Finn* may be *The Adventures of Tom Sawyer* (as the title Character, Tom Sawyer, is referenced throughout the novel). As such, if "Tom Sawyer" is identified as subject matter of the eBook, a search of the content data store 120 may reveal that a movie exists regarding this subject matter. In addition, a search of network data sources 108 may reveal that other supplemental content exists, such as commentary by scholars, documentaries regarding the fictional character, etc. Searches may be carried out, for example, by a search engine or other suitable search algorithm. Search engines and various search algorithms are generally known in the art, and as such will not be discussed further herein.

In some embodiments, the relevancy of supplemental content may be used to determine whether to present the supplemental content to the user. For example, a search algorithm may indicate the potential relevance of a found item of supplemental content is low (e.g., 30%). As such, the content management system 102 may choose to omit the item of supplemental content, so that the user is not presented with irrelevant content. In some such embodiments, a threshold relevance may be established, such that only very relevant supplemental content (e.g., 90% potential relevancy) is presented to the user. Further, in some embodiments, user preferences may specify the types of supplemental content that should be provided. For example, a user may specify the relevance threshold at which supplemental content should be provided. As a further example, a user may indicate that only specific topics of supplemental content (e.g., historical, technical, etc.) should be provided. Still further, in some embodiments, the content management system 102 may enable users to rate, classify, or comment on items of supplemental content. As such, a user may indicate which supplemental content should be indicated based on this user-generated feedback (e.g., only supplemental content rated at least 4 of fives stars, classified as interesting, etc.).

As described above with respect to identification of companion content, though automated mechanisms are described herein, embodiments of the present disclosure may utilize manual or semi-manual methods in conjunction with or exclusive of automated mechanisms. For example, in some embodiments, one or more parties may manually create synchronization information for a companion content pair (e.g., a producer, a distributor, or an end user). One skilled in the art will appreciate that a multitude of voting or crowd-sourcing techniques may be utilized to aggregate or filter input from a variety of sources.

At block 456, synchronization information regarding the base content and supplemental content may be generated. Such synchronization information may map each item of supplemental content to one or more locations within the base content. In some embodiments, an item of supplemental content may be mapped to a specific portion of the base content. For example, an item of supplemental content may be referenced by a single word, sentence, or paragraph. As such, the synchronization information may include a mapping of the item of supplemental content to the specific word, sentence, or paragraph. In instances where multiple words, sentences, or paragraphs reference an item of supplemental content, each referencing item may be mapped to the supplemental content. In other embodiments, supplemental content may regard the entirety of a base content. In these embodiments, mapping information may not be required.

At block 458, the content management system 102 may receive consumption information regarding a base content. As described above, this consumption information may generally be related to the currently consumed portion of a base content (e.g., a page of an eBook or a time stamp of an audio book). At block 460, the content management system 102 may determine relevant supplemental content based on the received consumption information and on the generated synchronization information. For example, each item of supplemental content which is mapped to a word, sentence, or paragraph on a currently read portion may be determined to be relevant supplemental content. At block 462, information regarding the relevant supplemental content may be transferred to the user's device. Such information may include, for example, the specific words, sentences, or paragraphs which relate to an item of supplemental content, the title or location of the supplemental content, or any other information regarding the supplemental content or presentation of the supplemental content to the user. Optionally, at block 464, the content management system 102 may transmit the supplemental content or a portion thereof to the user's device. In other embodiments, the user's device may already have access to the supplemental content. For example, the user's computing devices may have previously stored the supplemental content, or the supplemental content may be available for streaming from a network data source. In these embodiments, block 464 may be omitted.

The transmitted information regarding supplemental content (and, optionally, the supplemental content itself), may then be utilized at a user computing device to enable the user to request the supplemental content for consumption. For example, a user interface of an eBook reader may utilize the received information to prompt a user as to the availability of supplemental content. One such user interface is discussed in more detail below with respect to FIG. 6. As such, the routine 400 may end at block 414.

Figure 5:
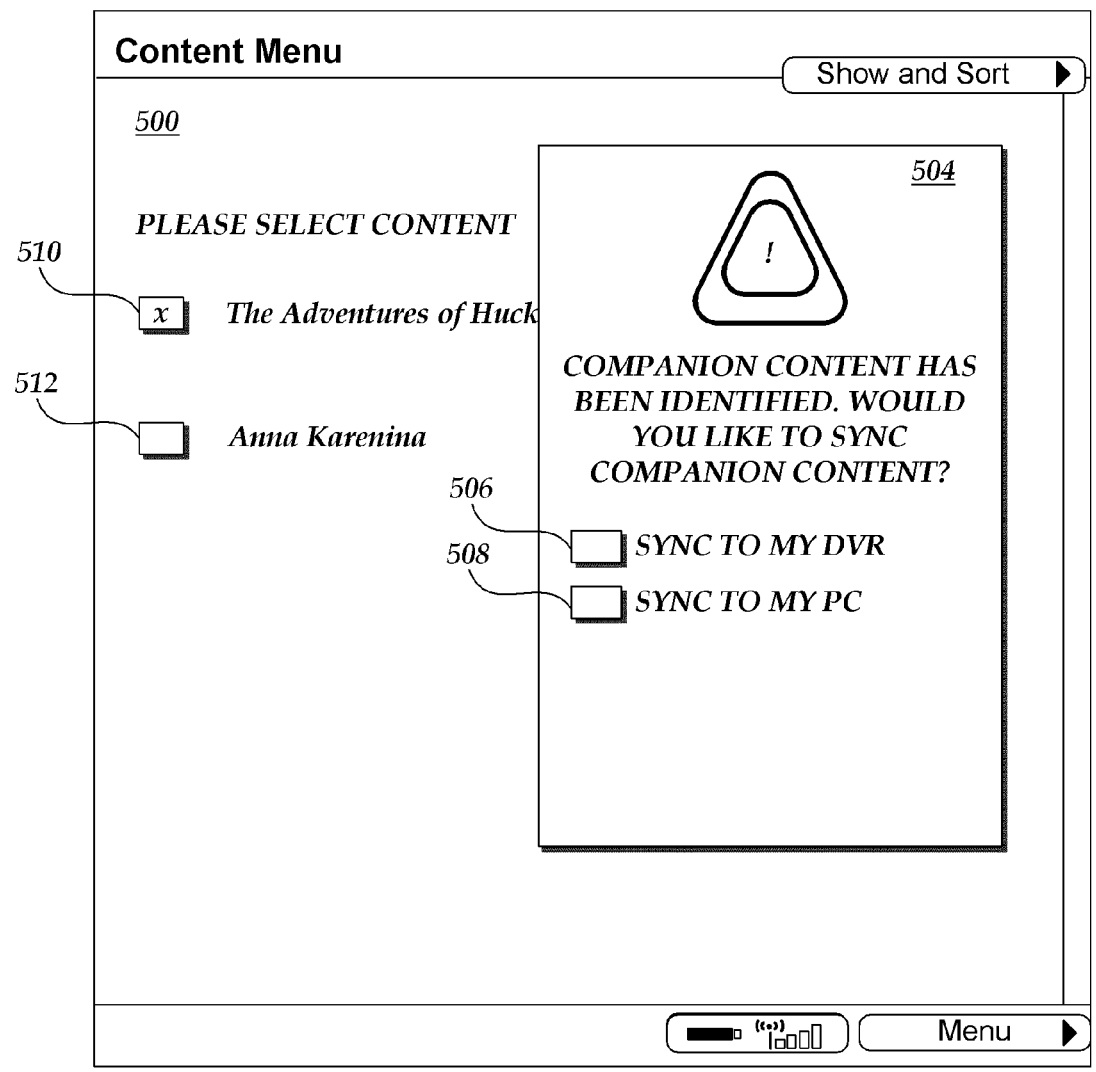
FIG. 5 depicts an illustrative control interface that may be used to manage synchronized playback of companion content.

With reference to FIG. 5, an illustrative interface 500 generated on a computing device, such as computing device 300 of FIG. 3, is shown. The illustrative interface 500 may be utilized for presenting and selecting options related to interchangeable presentation of companion content. By use of the interface 500, a user may select content (e.g., an eBook) via selection elements 510 or 512 presented by the interface 500. In response to the selection of content, the computing device 300 may determine whether the user has access to companion content. The computing device 300 may obtain synchronization information (e.g., from a content management system 102 and/or by content synchronization information itself) and/or obtain access to another content that is part of a companion content pair that includes the selected content. The computing device 300 may prompt a user to confirm a desire to synchronize the selected content (i.e., a base content) and the companion content for interchangeable output. As illustrated in FIG. 5, the interface 500 can include a second portion 504 that presents a notification indicating that there is available companion content that can be synchronized to allow interchangeable consumption of the base content and the companion content. Still further, the second portion 504 includes configuration components 506-508 for obtaining user input regarding synchronization configurations. Specifically, the second portion 504 includes input selections 508 and 510 for toggling whether to synchronize consumption of the companion content pair to one or more selected devices. Illustratively, a user may select input selection 508 to enable interchangeable consumption of the companion content pair on the computing device 300 (e.g., an eBook reader) and the user's DVR. That is, the user may consume an eBook on the eBook reader, halt consumption, and begin playback of a film adaptation at a corresponding point on the user's DVR, and vice versa. In some embodiments, a computing device 300 may itself be able to present companion content (e.g., where the computing device 300 has video output capability). As such, in these embodiments, the computing device 300 may be selectable as an option (not shown) within the second portion 504.

With reference to FIG. 6, an illustrative interface 600 generated on a computing device, such as computing device 300 of FIG. 3, is shown. The illustrative interface 600 may be utilized for presenting and selecting supplemental content corresponding to a displayed base content. As illustrated in FIG. 6, the interface 600 includes a portion 602 for presenting a base content (e.g., an eBook). Further, the interface 600 includes identifiers 604 and 608 identifying portions of the base content that correspond to available supplemental content. Illustratively, each identifier 604 or 608 is selectable by a user to display more information regarding the supplemental content. For example, in the illustrative user interface 600, the user has selected identifier 604, which resulted in the display of information dialog 606, displaying the title of the relevant supplemental content. As shown in FIG. 6, the portion of the base content identified by identifier 604 is related to supplemental content entitled "Civil Liberties in Pre-Civil War America," which may correspond, for example, to a documentary regarding the named subject.

In some embodiments, information dialog 606 may be selectable by a user to view the supplemental content immediately or substantially immediately (e.g., if the computing device 300 is capable of displaying the supplemental content). As described above, viewing of supplemental content may, in some embodiments, including downloading or streaming the supplemental content from a data source, such as a content data source 120 or other network data source 108. In other embodiments, the computing device 300 may not be capable of displaying the supplemental content (e.g., when the computing device 300 is a basic eBook reader), or the user may not wish to view supplemental content on the computing device 300. In these instances, the supplemental content may be transmitted, queued, or otherwise made available at another computing device of the user (e.g., a DVR, a television, a laptop, etc.).

One skilled in the relevant art will appreciate that the illustrative interfaces described above are provided for purposes of example only, and that embodiments of the interface may implement any number or combination of the features described with reference to FIGS. 5 and 6. The particular combination or functionality of features comprising control interfaces such as the illustrative control interfaces 500 and 600 of FIGS. 5 and 6 may be predefined by a user or computing device 300, determined by a remote service, or dynamically determined by the computing device 300 based on past observations of user behavior. Control interfaces 500 and 600 may be implemented on any number of devices as described above with reference to FIG. 3.

Although some of the examples were provided in the context of a retail environment in which a user purchases companion content and/or supplemental content, any combination of features described herein may be applied to other settings, as appropriate. For example, the user need not purchase content of a companion content pair in order to obtain content synchronization information and/or synchronously consume a base and companion content. Instead, the user may obtain access to one or more individual content of a companion content pair by any number of suitable ways, for example, by borrowing, checking out, renting, permanently leasing, temporarily leasing, or any combination thereof. In a specific example, the user may check out a movie adaptation of *The Adventures of Huckleberry Finn* and interchangeably present the movie while reading the corresponding eBook that the user has purchased. In another specific example, the user may lease a movie adaptation and interchangeably present the movie with a borrowed eBook.

Further, although some of the examples were provided in the context of interchangeably presenting content, any combination of features described herein may be applied to other content synchronization, as appropriate. For example, content synchronization information can be used synchronously present both a base content and a companion content simultaneously.

Still further, though description above generally relates to a base content of text or audio, in some embodiments, base content may correspond to video content. For example, base content may refer to a movie or video adapted to an audio or eBook format (or that has been adapted from an eBook or audio book). As such, the corresponding audio or eBook would constitute companion content to the base (movie or video) content.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for facilitating presentation of supplemental content, the system comprising:
    one or more data stores configured to store:
        information regarding a base content;
        information regarding one or more items of supplemental content, wherein each item of supplemental content comprises a video content associated with at least one subject referenced by the base content and providing additional information not included within the base content regarding the at least one subject; and
        content synchronization information that correlates positions within the base content with the one or more items of supplemental content; and
    one or more computer systems in communication with the one or more data stores, the one or more computer systems configured to:
        receive consumption information indicating a position of consumption of the base content;
        identify at least one item of supplemental content from the one or more items of supplemental content providing additional information regarding a subject referenced at the position of consumption, wherein the at least one item of supplemental content is identified based at least in part on the received consumption information and the content synchronization information; and
        transmit the at least one item of supplemental content to a user device for presentation to a user.

2. The system of claim 1, wherein the user device is at least one of a tablet, a laptop, a desktop, a mobile phone, a PDA, an eBook reader, a DVR, or a television.

3. The system of claim 1, wherein the base content is at least one of an eBook or an audio book.

4. The system of claim 1, wherein an item of supplemental content comprises at least one of a movie, a television show, a documentary, an educational video, an interview, amateur generated content, an indication of a specified content expected to be available in the future, a spin-off of a base content, or a derivative of the base content.

5. The system of claim 1, wherein the base content references includes an explicit reference to at least one of the one or more items of supplemental content.

6. A computer-implemented method for facilitating presentation of supplemental content, the computer-implemented method comprising:
    under control of one or more computing devices configured with specific computer executable instructions,
        receiving consumption information regarding consumption of a base content, the consumption information indicating a position of consumption of the base content;
        identifying one or more subject matters associated with the consumption information, the subject matters corresponding to subjects referenced by the base content;
        determining one or more items of supplemental content, each item of supplemental content regarding at least one of the identified one or more subject matters and providing additional information regarding the at least one subject not included within the base content, wherein each item of supplemental content differs from the base content in content medium; and
        transmitting at least a portion of the one or more items of supplemental content to a user device for presentation to a user.

7. The computer-implemented method of claim 6, wherein the user device corresponds to a device from which consumption information was received.

8. The computer-implemented method of claim 6, wherein determining one or more items of supplemental content comprises determining one or more items of supplemental based on synchronization information mapping supplemental content to one or more portions of the base content.

9. The computer-implemented method of claim 8 further comprising generating the synchronization information.

10. The computer-implemented method of claim 6, wherein identifying one or more subject matters associated with the consumption information comprises at least one of automatically identifying one or more subject matters associated with the consumption information or manually identifying one or more subject matters associated with the consumption information.

11. The computer-implemented method of claim 10, wherein manually identifying one or more subject matters associated with the consumption information is based at least in part on user classifications assigned to one or more portions of the base content.

12. The computer-implemented method of claim 10, wherein automatically identifying one or more subject matters associated with the consumption information comprises utilizing a search engine to search for supplemental content regarding text contained within the base content.

13. The computer-implemented method of claim 6, wherein the computer-implemented method is performed in real time.

14. A computer-readable, non-transitory storage medium having at least one computer-executable module for facilitating presentation of supplemental content, the at least one computer-executable module comprising:
a content management module configured to:
receive consumption information indicating a position of consumption of a base content;
determine at least one item of supplemental content associated with a subject referenced by the base content based at least in part on the received consumption information, wherein each item of supplemental content differs from the base content in content medium and provides additional information regarding the subject not included within the base content; and
transmit the at least one item of supplemental content to a user device for presentation to the user.

15. The computer-readable, non-transitory storage medium of claim 14, wherein the user device does not correspond to a device from which consumption information was received.

16. The computer-readable, non-transitory storage medium of claim 14, wherein the content management module is configured to transmit the at least one item of supplemental content to a user device for presentation to the user by streaming the at least a portion of the one or more items of supplemental content to the user device.

17. The computer-readable, non-transitory storage medium of claim 14, wherein the content management module is configured to determine that the user device has access to the one or more items of supplemental content.

18. The computer-readable, non-transitory storage medium of claim 14, wherein the user device is configured to synchronously present the base content and the at least one item of supplemental content.

19. The computer-readable, non-transitory storage medium of claim 14, wherein the user device is configured to enqueue the at least one item of supplemental content for playback on the user device.

20. The computer-readable, non-transitory storage medium of claim 14, wherein the content management module is further configured to determine at least one item of supplemental content associated with a subject referenced by the base content base at least in part on synchronization information.

21. The computer-readable, non-transitory storage medium of claim 14, wherein the synchronization information maps the at least one item of supplemental content to one or more portions of the base content.

22. The computer-readable, non-transitory storage medium of claim 14, wherein the position of consumption of a base content represents a percentage of the base content consumed by the user.

* * * * *

UNITED STATES PATENT AND TRADEMARK OFFICE
CERTIFICATE OF CORRECTION

PATENT NO. : 9,734,153 B2
APPLICATION NO. : 13/535264
DATED : August 15, 2017
INVENTOR(S) : Douglas Cho Hwang et al.

It is certified that error appears in the above-identified patent and that said Letters Patent is hereby corrected as shown below:

On the Title Page

In Column 2 (item (56)) at Line 13, Under Other Publications, change "Auitory-Visual" to --Auditory-Visual--.

In Column 1 (page 3, item (56)) at Line 25, Under Other Publications, change "eboo/" to --ebook/--.

In the Specification

In Column 24 at Line 20, Change "fives" to --five--.

In the Claims

In Column 28 at Line 36 (approx.), In Claim 5, after "content" delete "references".

In Column 30 at Line 29 (approx.), In Claim 20, change "base" to --based--.

Signed and Sealed this
Twenty-seventh Day of February, 2018

Andrei Iancu
*Director of the United States Patent and Trademark Office*